(12) United States Patent
Daugherty et al.

(10) Patent No.: US 12,133,559 B2
(45) Date of Patent: Nov. 5, 2024

(54) DEVICE AGNOSTIC PSA FOR AEROSOL GENERATION DEVICE

(71) Applicant: RAI Strategic Holdings, Inc., Winston-Salem, NC (US)

(72) Inventors: Sean Daugherty, Winston-Salem, NC (US); Sean Lukan, Winston-Salem, NC (US); Robert Logan Garris, Winston-Salem, NC (US); Keith Anderson, Winston-Salem, NC (US)

(73) Assignee: RAI STRATEGIC HOLDINGS, INC., Winston-Salem, NC (US)

( * ) Notice: Subject to any disclaimer, the term of this patent is extended or adjusted under 35 U.S.C. 154(b) by 269 days.

(21) Appl. No.: 17/469,229

(22) Filed: Sep. 8, 2021

(65) Prior Publication Data

US 2022/0079242 A1  Mar. 17, 2022

Related U.S. Application Data

(60) Provisional application No. 63/077,137, filed on Sep. 11, 2020.

(51) Int. Cl.
| | |
|---|---|
| *A24F 40/53* | (2020.01) |
| *A24F 40/51* | (2020.01) |
| *A24F 40/65* | (2020.01) |
| *H04B 10/11* | (2013.01) |
| *H04W 4/20* | (2018.01) |

(52) U.S. Cl.
CPC ............. *A24F 40/53* (2020.01); *A24F 40/51* (2020.01); *A24F 40/65* (2020.01); *H04B 10/11* (2013.01); *H04W 4/20* (2013.01)

(58) Field of Classification Search
CPC ................................ A24F 40/53; H04B 10/11
See application file for complete search history.

(56) References Cited

U.S. PATENT DOCUMENTS

| | | |
|---|---|---|
| 2001/0028251 A1 | 10/2001 | Okayasu |
| 2005/0109961 A1 | 5/2005 | Bittner |
| 2015/0147065 A1 | 5/2015 | Civelli et al. |
| 2018/0180890 A1 | 6/2018 | Baerenrodt et al. |
| 2019/0158938 A1 | 5/2019 | Bowen et al. |
| 2020/0315259 A1 | 10/2020 | Hubbard et al. |
| 2020/0315260 A1 | 10/2020 | Hubbard |
| 2020/0315261 A1 | 10/2020 | Hubbard et al. |

(Continued)

OTHER PUBLICATIONS

International Search Report and Written Opinion from International Application No. PCT/US2021/049575 dated Dec. 20, 2021, all pages cited in its entirety.

(Continued)

*Primary Examiner* — Christopher M Rodd
*Assistant Examiner* — Jennifer A Kessie
(74) *Attorney, Agent, or Firm* — Burr & Forman LLP

(57) ABSTRACT

A method of preventing unauthorized use of an aerosol provision device may include receiving a wireless signal including an unlock code for unlocking the aerosol provision device, processing the wireless signal to determine host device characterization information or environmental context information, tuning processing circuitry to process the unlock code based on the host device characterization information or environmental context information, and transitioning the aerosol provision device from a locked state to an unlocked state responsive to processing the unlock code.

6 Claims, 11 Drawing Sheets

(56) References Cited

U.S. PATENT DOCUMENTS

2020/0359703 A1    11/2020   Daugherty

OTHER PUBLICATIONS

Ahuja et al. LightAnchors: Appropriating Point Lights for Spatially-Anchored Augmented Reality Interfaces. Oct. 23, 20193 [retrieved on Oct. 11,2021]. Retrieved from the internet <URL: https://dl.acm.org/doi/pdf/10.1145/3332165.3347884 > entire document.

National Instruments. Introduction to Bluetooth Device Testing From Theory To Transmitter and Receiver Measurements. Sep. 30, 2016 [retrieved on Oct. 11, 2021]. Retrieved from the internet <URL: https://download.ni.com/evaluation/rf/intro_to_bluetooth_test.pdf> entire document.

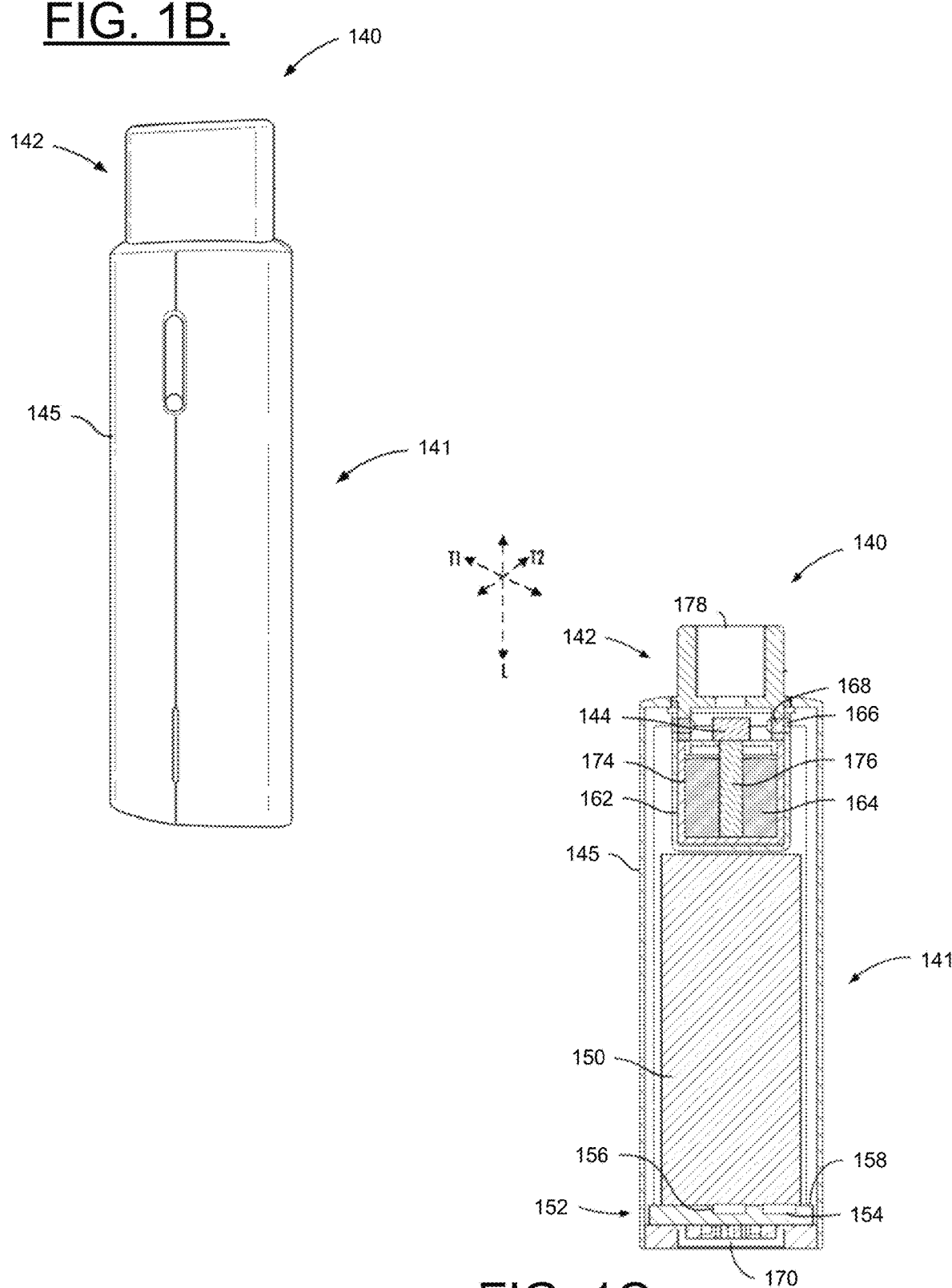

```
┌─────────────────────────────────────────────────┐
│ Receiving an optical signal including an unlock │──── 1000
│ code for unlocking an aerosol provision device  │
└─────────────────────────────────────────────────┘
                        │
                        ▼
┌─────────────────────────────────────────────────┐
│ Processing the optical signal to determine host │──── 1010
│ device characterization information or          │
│ environmental context information               │
└─────────────────────────────────────────────────┘
                        │
                        ▼
┌─────────────────────────────────────────────────┐
│ Tuning processing circuitry to process the      │──── 1020
│ unlock code based on the host device            │
│ characterization information or the             │
│ environmental context information               │
└─────────────────────────────────────────────────┘
                        │
                        ▼
┌─────────────────────────────────────────────────┐
│ Transitioning the aerosol provision device from │──── 1030
│ a locked state to an unlocked state responsive  │
│ to processing the unlock code                   │
└─────────────────────────────────────────────────┘
```

FIG. 10.

DEVICE AGNOSTIC PSA FOR AEROSOL GENERATION DEVICE

TECHNICAL FIELD

Example embodiments generally relate to non-combustible aerosol provision systems and, in particular, relate to providing an ability for device agnostic post sale activation (PSA) for an aerosol provision device.

BACKGROUND

Non-combustible aerosol provision systems (e.g., e-cigarettes/tobacco heating products or other such devices) generally contain an aerosolisable material, such as a reservoir of a source liquid containing a formulation. The formulation typically includes nicotine, or a solid material such as a tobacco-based product, from which an aerosol is generated for inhalation by a user, for example through heat vaporization. However, devices including formulations with other materials, such as cannabinoids (e.g., Tetrahydrocannabinol (THC) and/or Cannabidiol (CBD)), botanicals, medicinals, caffeine, and/or other active ingredients, are also possible. Thus, a non-combustible aerosol provision system will typically include an aerosol generation chamber containing a vaporizer, e.g., a heater, arranged to vaporize a portion of the aerosolisable material to generate an aerosol in the aerosol generation chamber. As a user inhales on a mouthpiece of the device and electrical power is supplied to the heater, air is drawn into the device and into the aerosol generation chamber where the air mixes with the vaporized aerosolisable material and forms a condensation aerosol. There is a flow path between the aerosol generation chamber and an opening in the mouthpiece so the air drawn through the aerosol generation chamber continues along the flow path to an opening in the mouthpiece, carrying some of the condensation aerosol with it, and out through the opening in the mouthpiece for inhalation by the user.

Aerosol provision systems include, for example, vapor products, such as those delivering nicotine that are commonly known as "electronic cigarettes," "e-cigarettes" or electronic nicotine delivery systems (ENDS), as well as heat-not-burn products including tobacco heating products (THPs). Many of these products take the form of a system including a device and a consumable, and it is the consumable that includes the material from which the substance to be delivered originates. Typically, the device is reusable, and the consumable is single-use (although some consumables are refillable as in the case of so called "open" systems). Therefore, in many cases, the consumable is sold separately from the device, and often in a multipack. Moreover, subsystems and some individual components of devices or consumables may be sourced from specialist manufacturers.

Aerosol provision devices, like those described above, may be subject to certain restrictions, including age restrictions. In some locations, use of the articles including the cartridges of an ENDS device is limited based on user age. To accommodate the need for authentication of a device by an age verified user, any of a number of authentication methods may be employed. However, many of these authentication methods may require interaction with a host device (e.g., a smartphone or other wireless communication device that can access authentication services). The host devices that may be in the possession of users can vary significantly in terms of their capabilities for processing and presenting information to the ENDS device that would be used for authentication. Moreover, environmental conditions may also impact the way certain information provided by the host device may be received at the ENDS device. In some cases, the variability could cause authentication efforts to fail merely based only on the impacts of these environmental conditions or device capabilities. As such, it may be desirable to introduce ways to allow the authentication process to be conducted with less reliance on specific device capabilities or environmental conditions.

BRIEF SUMMARY OF SOME EXAMPLES

In an example embodiment, an aerosol provision system may be provided. The aerosol provision system may include an aerosol provision device configured to interface with a consumable comprising aerosol generating material, an aerosol generator configured to generate an aerosol from the aerosol generating material, a lock assembly and an adaptive signal detector. The lock assembly may be configured to prevent operation of the aerosol generator for generating the aerosol in a locked or controlled state, and enable operation of the aerosol generator for generating the aerosol in an unlocked state. The lock assembly may also be configured to transition from the locked state to the unlocked state responsive to authentication of an unlock code received in a control signal from a host device in communication with an authentication agent via a network. The adaptive signal detector may include processing circuitry configured to process a control signal received wirelessly from the host device to extract the unlock code. The adaptive signal detector may also be configured to determine host device characterization information or environmental context information to facilitate extracting the unlock code from the control signal.

In another example embodiment, a method of preventing unauthorized use of an aerosol provision device may be provided. The method may include receiving a wireless signal including an unlock code for unlocking the aerosol provision device, processing the wireless signal to determine host device characterization information or environmental context information, tuning processing circuitry to process the unlock code based on the host device characterization information or environmental context information, and transitioning the aerosol provision device from a locked state to an unlocked state responsive to processing the unlock code.

It will be appreciated that this Brief Summary is provided merely for purposes of summarizing some example implementations to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

FIGS. 1B and 1C illustrate an aerosol provision system in the form of a vapor product, according to some example implementations;

FIG. 10 is a block diagram of a method of preventing unauthorized use of an aerosol provision system in accordance with an example embodiment.

DETAILED DESCRIPTION

Figure 1A:
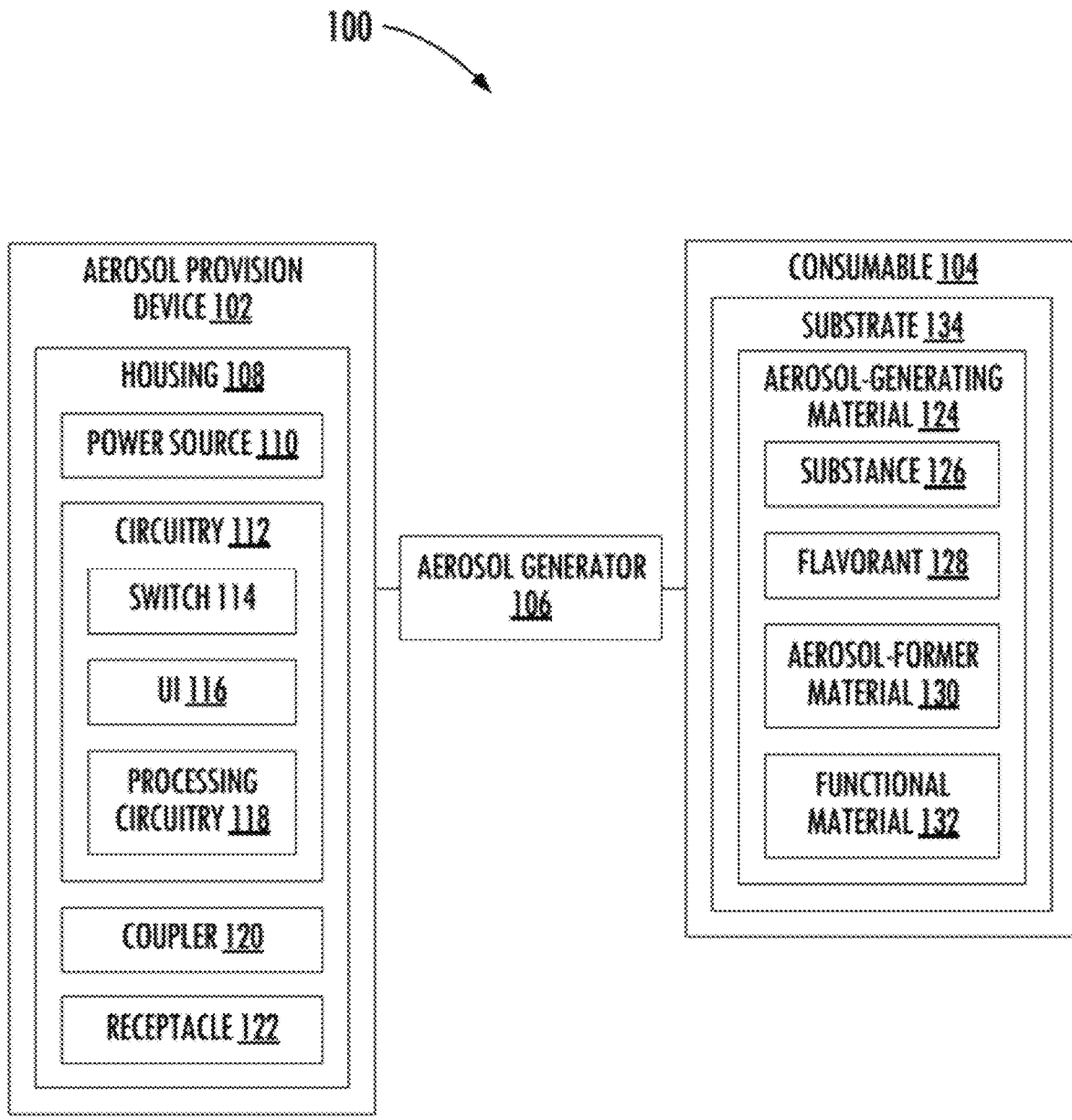
FIG. 1A illustrates a general block diagram of a non-combustible aerosol provision system that may be used in connection with an example embodiment.

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

As indicated above, the present disclosure relates to requiring an authentication of an age-restricted device, such as an aerosol delivery device or an electronic nicotine delivery systems ("ENDS") device. The authentication may include or require a prior age verification, such that the age-restricted device is not operational for a user that is not age-verified. The authentication may include the age-restricted device receiving a control signal for authenticating the device. The control signal may include audio signals and/or visual/optical signals for authenticating the device. In some case, the authentication may be initiated after a device wakeup procedure, in order to conserve power prior to authentication. However, in any case, the authentication (and/or wakeup) may be initiated by insertion of a dedicated module into the device. The module may therefore be added to minimize changes to existing ENDS device designs.

An aerosol delivery device or ENDS is one example of a device that may be associated with restriction, such as an age restriction. Other examples include delivery devices for delivery of cannabinoids, such as Tetrahydrocannabinol (THC) and/or Cannabidiol (CBD), botanicals, medicinals, and/or other active ingredients. Thus, it will be appreciated that while an aerosol delivery or ENDS device is used as an example application of various embodiments throughout, this example is intended to be non-limiting such that inventive concepts disclosed herein can be used with devices other than aerosol delivery or ENDS devices, including aerosol delivery devices that may be used to deliver other medicinal and/or active ingredients to a user or may include smokeless tobacco or other tobacco products.

The device authentication by a control signal can be in addition to, or may be required as a prerequisite to, the user performing age verification. A user that has not been age verified cannot authenticate a device. The authentication may need to be performed periodically for usage of an age-restricted product. There may be an age verification system for confirming an age of a user and/or authenticating the proper user and/or device. In any case, these activities may be referred to generally as post sale activation (PSA), and the signaling associated with device authentication and/or age verification may be impacted by the capabilities of the device providing such signaling and/or the environment in which the signal is sent. Thus, it may be desirable to configure the aerosol delivery device or ENDS to be able to accommodate a wide range of different device capabilities and signaling contexts. In other words, it may be desirable to provide the aerosol delivery device with a certain level of agility in terms of determining what capabilities or signaling contexts may be encountered for a given communication session, and adjust the characteristics of the aerosol delivery device to account for the information learned. By configuring the aerosol delivery device to have such agility, the aerosol delivery device may effectively become agnostic to the host device with which communication is required in order to employ PSA.

Given that example embodiments may be employed in connection with providing security for non-combustible aerosol provision systems such as ENDS devices, a general description of an example device will be provided since some aspects of the case described herein may be tailored to interface with such devices.

Unless specified otherwise or clear from context, references to first, second or the like should not be construed to imply a particular order. A feature described as being above another feature (unless specified otherwise or clear from context) may instead be below, and vice versa; and similarly, features described as being to the left of another feature else may instead be to the right, and vice versa. Also, while reference may be made herein to quantitative measures, values, geometric relationships or the like, unless otherwise stated, any one or more if not all of these may be absolute or approximate to account for acceptable variations that may occur, such as those due to engineering tolerances or the like.

As used herein, unless specified otherwise or clear from context, the "or" of a set of operands is the "inclusive or" and thereby true if and only if one or more of the operands is true, as opposed to the "exclusive or" which is false when all of the operands are true. Thus, for example, "[A] or [B]" is true if [A] is true, or if [B] is true, or if both [A] and [B] are true. Further, the articles "a" and "an" mean "one or more," unless specified otherwise or clear from context to be directed to a singular form. Furthermore, it should be understood that unless otherwise specified, the terms "data," "content," "digital content," "information," and similar terms may be at times used interchangeably.

Example implementations of the present disclosure are generally directed to delivery systems designed to deliver at least one substance to a user, such as to satisfy a particular "consumer moment." The substance may include constituents that impart a physiological effect on the user, a sensorial effect on the user, or both.

Delivery systems may take many forms. Examples of suitable delivery systems include aerosol provision systems such as powered aerosol provision systems designed to release one or more substances or compounds from an aerosol-generating material without combusting the aerosol-generating material. These aerosol provision systems may at times be referred to as non-combustible aerosol provision systems, aerosol delivery devices or the like, and the aerosol-generating material may be, for example, in the form of a solid, semi-solid, liquid or gel and may or may not contain nicotine.

Examples of suitable aerosol provision systems include vapor products, heat-not-burn products, hybrid products and the like. Vapor products are commonly known as "electronic cigarettes," "e-cigarettes" or electronic nicotine delivery systems (ENDS), although the aerosol-generating material need not include nicotine. Many vapor products are designed to heat a liquid material to generate an aerosol. Other vapor products are designed to break up an aerosol-generating material into an aerosol without heating, or with only secondary heating. Heat-not-burn products include tobacco heating products (THPs) and carbon-tipped tobacco heating products (CTHPs), and many are designed to heat a solid material to generate an aerosol without combusting the material.

Hybrid products use a combination of aerosol-generating materials, one or a plurality of which may be heated. Each of the aerosol-generating materials may be, for example, in the form of a solid, semi-solid, liquid, or gel. Some hybrid products are similar to vapor products except that the aerosol generated from a liquid or gel aerosol-generating material passes through a second material (such as tobacco) to pick up additional constituents before reaching the user. In some example implementations, the hybrid system includes a liquid or gel aerosol-generating material, and a solid aerosol-generating material. The solid aerosol-generating material may include, for example, tobacco or a non-tobacco product.

FIG. 1A is a block diagram of an aerosol provision system 100 according to some example implementations. In various examples, the aerosol provision system may be a vapor product, heat-not-burn product or hybrid product. The aerosol provision system includes one or more of each of a number of components including, for example, an aerosol provision device 102, and a consumable 104 (sometimes referred to as an article) for use with the aerosol provision device. The aerosol provision system also includes an aerosol generator 106. In various implementations, the aerosol generator may be part of the aerosol provision device or the consumable. In other implementations, the aerosol generator may be separate from the aerosol provision device and the consumable, and removably engaged with the aerosol provision device and/or the consumable.

In various examples, the aerosol provision system 100 and its components including the aerosol provision device 102 and the consumable 104 may be reusable or single-use. In some examples, the aerosol provision system including both the aerosol provision device and the consumable may be single use. In some examples, the aerosol provision device may be reusable, and the consumable may be reusable (e.g., refillable) or single use (e.g., replaceable). In yet further examples, the consumable may be both refillable and also replaceable. In examples in which the aerosol generator 106 is part of the aerosol provision device or the consumable, the aerosol generator may be reusable or single-use in the same manner as the aerosol provision device or the consumable.

In some example implementations, the aerosol provision device 102 may include a housing 108 with a power source 110 and circuitry 112. The power source is configured to provide a source of power to the aerosol provision device and thereby the aerosol provision system 100. The power source may be or include, for example, an electric power source such as a non-rechargeable battery or a rechargeable battery, solid-state battery (SSB), lithium-ion battery, supercapacitor, or the like.

The circuitry 112 may be configured to enable one or more functionalities (at times referred to as services) of the aerosol provision device 102 and thereby the aerosol provision system 100. The circuitry includes electronic components, and in some examples one or more of the electronic components may be formed as a circuit board such as a printed circuit board (PCB).

In some examples, the circuitry 112 includes at least one switch 114 that may be directly or indirectly manipulated by a user to activate the aerosol provision device 102 and thereby the aerosol provision system 100. The switch may be or include a pushbutton, touch-sensitive surface or the like that may be operated manually by a user. Additionally or alternatively, the switch may be or include a sensor configured to sense one or more process variables that indicate use of the aerosol provision device or aerosol provision system. One example is a flow sensor, pressure sensor, pressure switch or the like that is configured to detect airflow or a change in pressure caused by airflow when a user draws on the consumable 104.

The switch 114 may provide user interface functionality. In some examples, the circuitry 112 may include a user interface (UI) 116 that is separate from or that is or includes the switch. The UI may include one or more input devices and/or output devices to enable interaction between the user and the aerosol provision device 102. As described above with respect to the switch, examples of suitable input devices include pushbuttons, touch-sensitive surfaces and the like. The one or more output devices generally include devices configured to provide information in a human-perceptible form that may be visual, audible or tactile/haptic. Examples of suitable output devices include light sources such as light-emitting diodes (LEDs), quantum dot-based LEDs and the like. Other examples of suitable output devices include display devices (e.g., electronic visual displays), touchscreens (integrated touch-sensitive surface and display device), loudspeakers, vibration motors and the like.

In some examples, the circuitry 112 includes processing circuitry 118 configured to perform data processing, application execution, or other processing, control or management services according to one or more example implementations. The processing circuitry may include a processor embodied in a variety of forms such as at least one processor core, microprocessor, coprocessor, controller, microcontroller or various other computing or processing devices including one or more integrated circuits such as, for example, an ASIC (application specific integrated circuit), an FPGA (field programmable gate array), some combination thereof, or the like. In some examples, the processing circuitry may include memory coupled to or integrated with the processor, and which may store data, computer program instructions executable by the processor, some combination thereof, or the like.

As also shown, in some examples, the housing 108 and thereby the aerosol provision device 102 may also include a coupler 120 and/or a receptacle 122 structured to engage and hold the consumable 104, and thereby couple the aerosol provision device with the consumable. The coupler may be or include a connector, fastener or the like that is configured to connect with a corresponding coupler of the consumable, such as by a press fit (or interference fit) connection, threaded connection, magnetic connection or the like. The receptacle may be or include a reservoir, tank, container, cavity, receiving chamber or the like that is structured to receive and contain the consumable or at least a portion of the consumable.

The consumable 104 is an article including aerosol-generating material 124 (also referred to as an aerosol precursor composition), part or all of which is intended to be consumed during use by a user. The aerosol provision system 100 may include one or more consumables, and each consumable may include one or more aerosol-generating materials. In some examples in which the aerosol provision system is a hybrid product, the aerosol provision system may include a liquid or gel aerosol-generating material to generate an aerosol, which may then pass through a second, solid aerosol-generating material to pick up additional constituents before reaching the user. These aerosol-generating materials may be within a single consumable or respective consumables that may be separately removable.

The aerosol-generating material 124 is capable of generating aerosol, for example when heated, irradiated or energized in any other way. The aerosol-generating material may be, for example, in the form of a solid, semi-solid, liquid or gel. The aerosol-generating material may include an "amorphous solid," which may be alternatively referred to as a "monolithic solid" (i.e., non-fibrous). In some examples, the amorphous solid may be a dried gel. The amorphous solid is a solid material that may retain some fluid, such as liquid, within it. In some examples, the aerosol-generating material may include from about 50 wt %, 60 wt % or 70 wt % of amorphous solid, to about 90 wt %, 95 wt % or 100 wt % of amorphous solid.

The aerosol-generating material 124 may include one or more of each of a number of constituents such as an active substance 126, flavorant 128, aerosol-former material 130 or other functional material 132.

The active substance 126 may be a physiologically active material, which is a material intended to achieve or enhance a physiological response such as improved alertness, improved focus, increased energy, increased stamina, increased calm or improved sleep. The active substance may for example be selected from nutraceuticals, nootropics, psychoactives. The active substance may be naturally occurring or synthetically obtained. The active substance may include, for example, nicotine, caffeine, GABA (γ-aminobutyric acid), L-theanine, taurine, theine, vitamins such as B6 or B12 (cobalamin) or C, melatonin, cannabinoids, terpenes, or constituents, derivatives, or combinations thereof. The active substance may include one or more constituents, derivatives or extracts of tobacco, *cannabis* or another botanical.

In some examples in which the active substance 126 includes derivatives or extracts, the active substance may be or include one or more cannabinoids or terpenes.

As noted herein, the active substance 126 may include or be derived from one or more botanicals or constituents, derivatives or extracts thereof. As used herein, the term "botanical" includes any material derived from plants including, but not limited to, extracts, leaves, bark, fibers, stems, roots, seeds, flowers, fruits, pollen, husk, shells or the like. Alternatively, the material may include an active compound naturally existing in a botanical, obtained synthetically. The material may be in the form of liquid, gas, solid, powder, dust, crushed particles, granules, pellets, shreds, strips, sheets, or the like. Example botanicals are tobacco, *eucalyptus*, star anise, hemp, cocoa, *cannabis*, fennel, lemongrass, peppermint, spearmint, rooibos, chamomile, flax, ginger, *Ginkgo biloba*, hazel, hibiscus, laurel, licorice (liquorice), matcha, mate, orange skin, *papaya*, rose, sage, tea such as green tea or black tea, thyme, clove, cinnamon, coffee, aniseed (anise), basil, bay leaves, cardamom, coriander, cumin, nutmeg, oregano, paprika, rosemary, saffron, lavender, lemon peel, mint, juniper, elderflower, vanilla, wintergreen, beefsteak plant, *curcuma*, turmeric, sandalwood, cilantro, bergamot, orange blossom, myrtle, cassis, valerian, pimento, mace, damien, marjoram, olive, lemon balm, lemon basil, chive, *carvi, verbena*, tarragon, geranium, mulberry, *ginseng*, theanine, theacrine, maca, ashwagandha, damiana, guarana, chlorophyll, baobab or any combination thereof. The mint may be chosen from the following mint varieties: *Mentha* Arventis, *Mentha* c.v., *Mentha niliaca, Mentha piperita, Mentha piperita citrata* c.v., *Mentha piperita* c.v, *Mentha spicata crispa, Mentha cardifolia, Mentha longifolia, Mentha suaveolens variegata, Mentha pulegium, Mentha spicata* c.v. and *Mentha suaveolens*.

In yet other examples, the active substance 126 may be or include one or more of 5-hydroxytryptophan (5-HTP)/oxitriptan/*Griffonia simplicifolia*, acetylcholine, arachidonic acid (AA, omega-6), ashwagandha (*Withania somnifera*), *Bacopa monniera*, beta alanine, beta-hydroxy-beta-methylbutyrate (HMB), *Centella asiatica*, chai-hu, cinnamon, citicoline, cotinine, creatine, curcumin, docosahexaenoic acid (DHA, omega-3), dopamine, *Dorstenia arifolia, Dorstenia odorata*, essential oils, GABA, *Galphimia glauca*, glutamic acid, hops, *Kaempferia parviflora* (Thai *ginseng*), kava, L-carnitine, L-arginine, lavender oil, L-choline, liquorice, L-lysine, L-theanine, L-tryptophan, lutein, magnesium, magnesium L-threonate, myo-inositol, *Nardostachys chinensis*, nitrate, oil-based extract of *Viola odorata*, oxygen, phenylalanine, phosphatidylserine, quercetin, resveratrol, *Rhizoma gastrodiae, Rhodiola, Rhodiola rosea*, rose essential oil, S-adenosylmethionine (SAMe), *sceletium tortuosum*, schisandra, selenium, serotonin, skullcap, spearmint extract, spikenard, theobromine, tumaric, *Turnera aphrodisiaca*, tyrosine, vitamin A, vitamin B3, or yerba mate.

In some example implementations, the aerosol-generating material 124 includes a flavorant 128. As used herein, the terms "flavorant" and "flavor" refer to materials which, where local regulations permit, may be used to create a desired taste, aroma or other somatosensorial sensation in a product for adult consumers. Flavorants may include naturally occurring flavor materials, botanicals, extracts of botanicals, synthetically obtained materials, or combinations thereof (e.g., tobacco, *cannabis*, licorice (liquorice), *hydrangea*, eugenol, Japanese white bark *magnolia* leaf, chamomile, fenugreek, clove, maple, matcha, menthol, Japanese mint, aniseed (anise), cinnamon, turmeric, Indian spices, Asian spices, herb, wintergreen, cherry, berry, redberry, cranberry, peach, apple, orange, mango, clementine, lemon, lime, tropical fruit, *papaya*, rhubarb, grape, durian, dragon fruit, cucumber, blueberry, mulberry, citrus fruits, Drambuie, bourbon, scotch, whiskey, gin, tequila, rum, spearmint, peppermint, lavender, aloe vera, cardamom, celery, cascarilla, nutmeg, sandalwood, bergamot, geranium, khat, naswar, *betel*, shisha, pine, honey essence, rose oil, vanilla, lemon oil, orange oil, orange blossom, cherry blossom, *cassia*, caraway, cognac, jasmine, ylang-ylang, sage, fennel, wasabi, piment, ginger, coriander, coffee, hemp, a mint oil from any species of the genus *Mentha, eucalyptus*, star anise, cocoa, lemongrass, rooibos, flax, *Ginkgo biloba*, hazel, hibiscus, laurel, mate, orange skin, rose, tea such as green tea or black tea, thyme, juniper, elderflower, basil, bay leaves, cumin, oregano, paprika, rosemary, saffron, lemon peel, mint, beefsteak plant, *curcuma*, cilantro, myrtle, cassis, valerian, pimento, mace, damien, marjoram, olive, lemon balm, lemon basil, chive, *carvi, verbena*, tarragon, limonene, thymol, camphene), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. Flavorants may be imitation, synthetic or natural ingredients or blends thereof. Flavorants may be in any suitable form, for example, liquid such as an oil, solid such as a powder, or gas.

In some example implementations, the flavorant 128 may include a sensate, which is intended to achieve a somatosensorial sensation which are usually chemically induced and perceived by the stimulation of the fifth cranial nerve (trigeminal nerve), in addition to or in place of aroma or taste nerves, and these may include agents providing heating, cooling, tingling, numbing effect. A suitable heat effect agent may be, but is not limited to, vanillyl ethyl ether and a suitable cooling agent may be, but not limited to eucolyptol, WS-3.

The aerosol-former material 130 may include one or more constituents capable of forming an aerosol. In some example implementations, the aerosol-former material may include one or more of glycerine, glycerol, propylene glycol, diethylene glycol, triethylene glycol, tetraethylene glycol, 1,3-butylene glycol, erythritol, meso-Erythritol, ethyl vanillate, ethyl laurate, a diethyl suberate, triethyl citrate, triacetin, a diacetin mixture, benzyl benzoate, benzyl phenyl acetate, tributyrin, lauryl acetate, lauric acid, myristic acid, and propylene carbonate.

The one or more other functional materials 132 may include one or more of pH regulators, colouring agents, preservatives, binders, fillers, stabilizers, and/or antioxidants. Suitable binders include, for example, pectin, guar gum, fruit pectin, citrus pectin, tobacco pectin, hydroxyethyl guar gum, hydroxypropyl guar gum, hydroxyethyl locust bean gum, hydroxypropyl locust bean gum, alginate, starch, modified starch, derivatized starch, methyl cellulose, ethyl cellulose, ethylhydroxymethyl cellulose, carboxymethyl cellulose, tamarind gum, dextran, pullalon, konjac flour or xanthan gum.

In some example implementations, the aerosol-generating material 124 may be present on or in a support to form a substrate 134. The support may be or include, for example, paper, card, paperboard, cardboard, reconstituted material (e.g., a material formed from reconstituted plant material, such as reconstituted tobacco, reconstituted hemp, etc.), a plastics material, a ceramic material, a composite material, glass, a metal, or a metal alloy. In some examples, the support includes a susceptor, which may be embedded within the aerosol-generating material, or on one or either side of the aerosol-generating material.

Although not separately shown, in some example implementations, the consumable 104 may further include receptacle structured to engage and hold the aerosol-generating material 124, or substrate 134 with the aerosol-generating material. The receptacle may be or include a reservoir, tank, container, cavity, receiving chamber or the like that is structured to receive and contain the aerosol-generating material or the substrate. The consumable may include an aerosol-generating material transfer component (also referred to as a liquid transport element) configured to transport aerosol-generating material to the aerosol generator 106. The aerosol-generating material transfer component may be adapted to wick or otherwise transport aerosol-generating material via capillary action. In some examples, the aerosol-generating material transfer component may include a microfluidic chip, a micro pump or other suitable component to transport aerosol-generating material.

The aerosol generator 106 (also referred to as an atomizer, aerosolizer or aerosol production component) is configured to energize the aerosol-generating material 124 to generate an aerosol, or otherwise cause generation of an aerosol from the aerosol-generating material. More particularly, in some examples, the aerosol generator may be powered by the power source 110 under control of the circuitry 112 to energize the aerosol-generating material to generate an aerosol.

In some example implementations, the aerosol generator 106 is an electric heater configured to perform electric heating in which electrical energy from the power source is converted to heat energy, which the aerosol-generating material is subject to so as to release one or more volatiles from the aerosol-generating material to form an aerosol. Examples of suitable forms of electric heating include resistance (Joule) heating, induction heating, dielectric and microwave heating, radiant heating, arc heating and the like. More particular examples of suitable electric heaters include resistive heating elements such as wire coils, flat plates, prongs, micro heaters or the like.

In some example implementations, the aerosol generator 106 is configured to cause an aerosol to be generated from the aerosol-generating material without heating, or with only secondary heating. For example, the aerosol generator may be configured to subject the aerosol-generating material to one or more of increased pressure, vibration, or electrostatic energy. More particular examples of these aerosol generators include jet nebulizers, ultrasonic wave nebulizers, vibrating mesh technology (VMT) nebulizers, surface acoustic wave (SAW) nebulizers, and the like.

A jet nebulizer is configured to use compressed gas (e.g., air, oxygen) to break up aerosol-generating material 124 into an aerosol, and an ultrasonic wave nebulizer is configured to use ultrasonic waves to break up aerosol-generating material into an aerosol. A VMT nebulizer includes a mesh, and a piezo material (e.g., piezoelectric material, piezomagnetic material) that may be driven to vibrate and cause the mesh to break up aerosol-generating material into an aerosol. A SAW nebulizer is configured to use surface acoustic waves or Rayleigh waves to break up aerosol-generating material into an aerosol.

In some examples, the aerosol generator 106 may include a susceptor, or the susceptor may be part of the substrate 134. The susceptor is a material that is heatable by penetration with a varying magnetic field generated by a magnetic field generator that may be separate from or part of the aerosol generator. The susceptor may be an electrically-conductive material, so that penetration thereof with a varying magnetic field causes induction heating of the heating material. The heating material may be magnetic material, so that penetration thereof with a varying magnetic field causes magnetic hysteresis heating of the heating material. The susceptor in some examples may be both electrically-conductive and magnetic, so that the susceptor of these examples is heatable by both heating mechanisms.

Although not separately shown, either or both the aerosol provision device 102 or the consumable 104 may include an aerosol-modifying agent. The aerosol-modifying agent is a substance configured to modify the aerosol generated from the aerosol-generating material 124, such as by changing the taste, flavor, acidity or another characteristic of the aerosol. In various examples, the aerosol-modifying agent may be an additive or a sorbent. The aerosol-modifying agent may include, for example, one or more of a flavorant, colorant, water or carbon adsorbent. The aerosol-modifying agent may be a solid, semi-solid, liquid or gel. The aerosol-modifying agent may be in powder, thread or granule form. The aerosol-modifying agent may be free from filtration material. In some examples, the aerosol-modifying agent may be provided in an aerosol-modifying agent release component, that is operable to selectively release the aerosol-modifying agent.

The aerosol provision system 100 and its components including the aerosol provision device 102, consumable 104, and aerosol generator 106 may be manufactured with any of a number of different form factors, and with additional or alternative components relative to those described above.

FIGS. 1B and 1C illustrate an aerosol provision system 140 in the form of a vapor product, and that in some example implementations may correspond to the aerosol provision system 100. As shown, the aerosol provision system 140 may include an aerosol provision device 141 (also referred to as a control body or power unit) and a consumable 142 (also referred to as a cartridge or tank), which may correspond to respectively the aerosol provision device 102 and the consumable 104. The aerosol provision system and in particular the consumable may also include an aerosol generator corresponding to the aerosol generator 106, and in the form of an electric heater 144 such as a heating element like a metal plate or metal wire coil configured to convert electrical energy to heat energy through resistance (Joule) heating. The aerosol provision device and the consumable can be permanently or detachably aligned in a functioning relationship. FIGS. 1B and 1C illustrate respectively a perspective view and a partially cut-away side view of the aerosol provision system in a coupled configuration.

As seen in FIG. 1B and the cut-away view illustrated in FIG. 1C, the aerosol provision device 141 and consumable 142 each include a number of respective components. The components illustrated in FIG. 1C are representative of the components that may be present in an aerosol provision device and consumable and are not intended to limit the scope of components that are encompassed by the present disclosure.

The aerosol provision device 141 may include a housing 145 (sometimes referred to as an aerosol provision device shell) that may include a power source 150. The housing may also include circuitry 152 with a switch in the form of a sensor 154, a user interface including a light source 156 that may be illuminated with use of the aerosol provision system 140, and processing circuitry 158 (also referred to as a control component). The housing may also include a receptacle in the form of a consumable receiving chamber 162 structured to engage and hold the consumable 142. And the consumable may include an aerosol-generating material 164 that may correspond to aerosol-generating material 124, and that may include one or more of each of a number of constituents such as an active substance, flavorant, aerosol-former material or other functional material.

As also seen in FIG. 1C, the aerosol provision device 141 may also include electrical connectors 166 positioned in the consumable receiving chamber 162 configured to electrically couple the circuitry and thereby the aerosol provision device with the consumable 142, and in particular electrical contacts 168 on the consumable. In this regard, the electrical connectors and electrical contacts may form a connection interface of the aerosol provision device and consumable. As also shown, the aerosol provision device may include an external electrical connector 170 to connect the aerosol provision device with one or more external devices. Examples of suitable external electrical connectors include USB connectors, proprietary connectors such as Apple's Lightning connector, and the like.

In various examples, the consumable 142 includes a tank portion and a mouthpiece portion. The tank portion and the mouthpiece portion may be integrated or permanently fixed together, or the tank portion may itself define the mouthpiece portion (or vice versa). In other examples, the tank portion and the mouthpiece portion may be separate and removably engaged with one another.

The consumable 142, tank portion and/or mouthpiece portion may be separately defined in relation to a longitudinal axis (L), a first transverse axis (T1) that is perpendicular to the longitudinal axis, and a second transverse axis (T2) that is perpendicular to the longitudinal axis and is perpendicular to the first transverse axis. The consumable can be formed of a housing 172 (sometimes referred to as the consumable shell) enclosing a reservoir 174 (in the tank portion) configured to retain the aerosol-generating material 164. In some examples, the consumable may include an aerosol generator, such as electric heater 144 in the illustrated example. In some examples, the electrical connectors 166 on the aerosol provision device 141 and electrical contacts 168 on the consumable may electrically connect the electric heater with the power source 150 and/or circuitry 152 of the aerosol provision device.

As shown, in some examples, the reservoir 174 may be in fluid communication with an aerosol-generating material transfer component 176 adapted to wick or otherwise transport aerosol-generating material 164 stored in the reservoir housing to the electric heater 144. At least a portion of the aerosol-generating material transfer component may be positioned proximate (e.g., directly adjacent, adjacent, in close proximity to, or in relatively close proximity to) the electric heater. The aerosol-generating material transfer component may extend between the electric heater and the aerosol-generating material stored in the reservoir, and at least a portion of the electric heater may be located above a proximal end the reservoir. For the purposes of the present disclosure, it should be understood that the term "above" in this particular context should be interpreted as meaning toward a proximal end of the reservoir and/or the consumable 142 in direction substantially along the longitudinal axis (L). Other arrangements of the aerosol-generating material transfer component are also contemplated within the scope of the disclosure. For example, in some example implementations, the aerosol-generating material transfer component may be positioned proximate a distal end of the reservoir and/or arranged transverse to the longitudinal axis (L).

The electric heater 144 and aerosol-generating material transfer component 176 may be configured as separate elements that are fluidly connected, the electric heater and aerosol-generating material transfer component or may be configured as a combined element. For example, in some implementations an electric heater may be integrated into an aerosol-generating material transfer component. Moreover, the electric heater and the aerosol-generating material transfer component may be formed of any construction as otherwise described herein. In some examples, a valve may be positioned between the reservoir 174 and electric heater, and configured to control an amount of aerosol-generating material 164 passed or delivered from the reservoir to the electric heater.

An opening 178 may be present in the housing 172 (e.g., at the mouth end of the mouthpiece portion) to allow for egress of formed aerosol from the consumable 142.

As indicated above, the circuitry 152 of the aerosol provision device 141 may include a number of electronic components, and in some examples may be formed of a circuit board such as a PCB that supports and electrically connects the electronic components. The sensor 154 (switch) may be one of these electronic components positioned on the circuit board. In some examples, the sensor may comprise its own circuit board or other base element to which it can be attached. In some examples, a flexible circuit board may be utilized. A flexible circuit board may be configured into a variety of shapes. In some examples, a flexible circuit board may be combined with, layered onto, or form part or all of a heater substrate.

In some examples, the reservoir 174 may be a container for storing the aerosol-generating material 164. In some examples, the reservoir may be or include a fibrous reservoir with a substrate with the aerosol-generating material present on or in a support. For example, the reservoir can comprise one or more layers of nonwoven fibers substantially formed into the shape of a tube encircling the interior of the housing 172, in this example. The aerosol-generating material may be retained in the reservoir. Liquid components, for example, may be absorptively retained by the reservoir. The reservoir may be in fluid connection with the aerosol-generating material transfer component 176. The aerosol-generating material transfer component may transport the aerosol-generating material stored in the reservoir via capillary action—or via a micro pump—to the electric heater 144. As such, the electric heater is in a heating arrangement with the aerosol-generating material transfer component.

In use, when a user draws on the aerosol provision system 140, airflow is detected by the sensor 154, and the electric heater 144 is activated to energize the aerosol-generating material 164 to generate an aerosol. Drawing upon the mouth end of the aerosol provision system causes ambient air to enter and pass through the aerosol provision system. In the consumable 142, the drawn air combines with the aerosol that is whisked, aspirated or otherwise drawn away from the electric heater and out the opening 178 in the mouth end of the aerosol provision system.

Figure 1D:
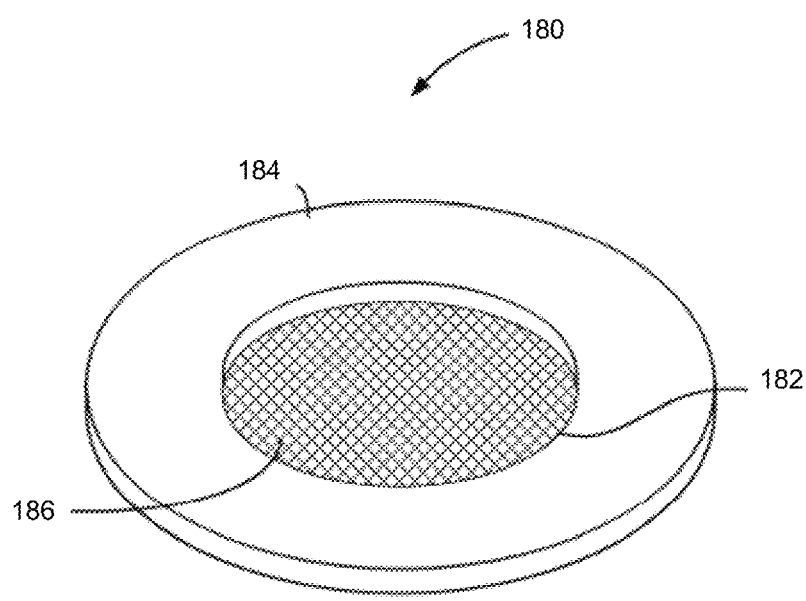
FIG. 1D illustrates a nebulizer that may be used to implement an aerosol generator of an aerosol provision system, according to some example implementations.

Again, as shown in FIGS. 1B and 1C, the aerosol generator of the aerosol provision system 140 is an electric heater 144 designed to heat the aerosol-generating material 164 to generate an aerosol. In other implementations, the aerosol generator is designed to break up the aerosol-generating material without heating, or with only secondary heating. FIG. 1D illustrates a nebulizer 180 that may be used to implement the aerosol generator of an aerosol provision system, according to some these other example implementations.

As shown in FIG. 1D, the nebulizer 180 includes a mesh plate 182 and a piezo material 184 that may be affixed to one another. The piezo material may be driven to vibrate and cause the mesh plate to break up aerosol-generating material into an aerosol. In some examples, the nebulizer may also include a supporting component located on a side of the mesh plate opposite the piezo material to increase the longevity of the mesh plate, and/or an auxiliary component between the mesh plate and the piezo material to facilitate interfacial contact between the mesh plate and the piezo material.

In various example implementations, the mesh plate 182 may have a variety of different configurations. The mesh plate may have a flat profile, a domed shape (concave or convex with respect to the aerosol-generating material), or a flat portion and a domed portion. The mesh plate defines a plurality of perforations 186 that may be substantially uniform or vary in size across a perforated portion of the mesh plate. The perforations may be circular openings or non-circular openings (e.g., oval, rectangular, triangular, regular polygon, irregular polygon). In three-dimensions, the perforations may have a fixed cross section such as in the case of cylindrical perforations with a fixed circular cross section, or a variable cross section such as in the case of truncated cone perforations with a variable circular cross section. In other implementations, the perforations may be tetragonal or pyramidal.

The piezo material 184 may be or include a piezoelectric material or a piezomagnetic material. A piezoelectric material may be coupled to circuitry configured to produce an oscillating electric signal to drive the piezoelectric material to vibrate. For a piezomagnetic material, the circuitry may produce a pair of antiphase, oscillating electric signals to drive a pair of magnets to produce antiphase, oscillating magnetic fields that drives the piezomagnetic material to vibrate.

The piezo material 184 may be affixed to the mesh plate 182, and vibration of the piezo material may in turn cause the mesh plate to vibrate. The mesh plate may be in contact with or immersed in aerosol-generating material, in sufficient proximity of aerosol-generating material, or may otherwise receive aerosol-generating material via an aerosol-generating material transfer component. The vibration of the mesh plate, then, may cause the aerosol-generating material to pass through the perforations 186 that break up the aerosol-generating material into an aerosol. More particularly, in some examples, aerosol-generating material may be driven through the perforations 186 in the vibrating mesh plate 182 resulting in aerosol particles. In other examples in which the mesh plate is in contact with or immersed in aerosol-generating material, the vibrating mesh plate may create ultrasonic waves within aerosol-generating material that cause formation of an aerosol at the surface of the aerosol-generating material.

As described above, hybrid products use a combination of aerosol-generating materials, and some hybrid products are similar to vapor products except that the aerosol generated from one aerosol-generating material may pass through a second aerosol-generating material to pick up additional constituents. Another similar aerosol provision system in the form of a hybrid product may therefore be constructed similar to the vapor product in FIGS. 1B and 1C (with an electric heater 144 or a nebulizer 180). The hybrid product may include a second aerosol-generating material through which aerosol from the aerosol-generating material 164 is passed to pick up additional constituents before passing through the opening 178 in the mouth end of the aerosol provision system.

Figure 2A:
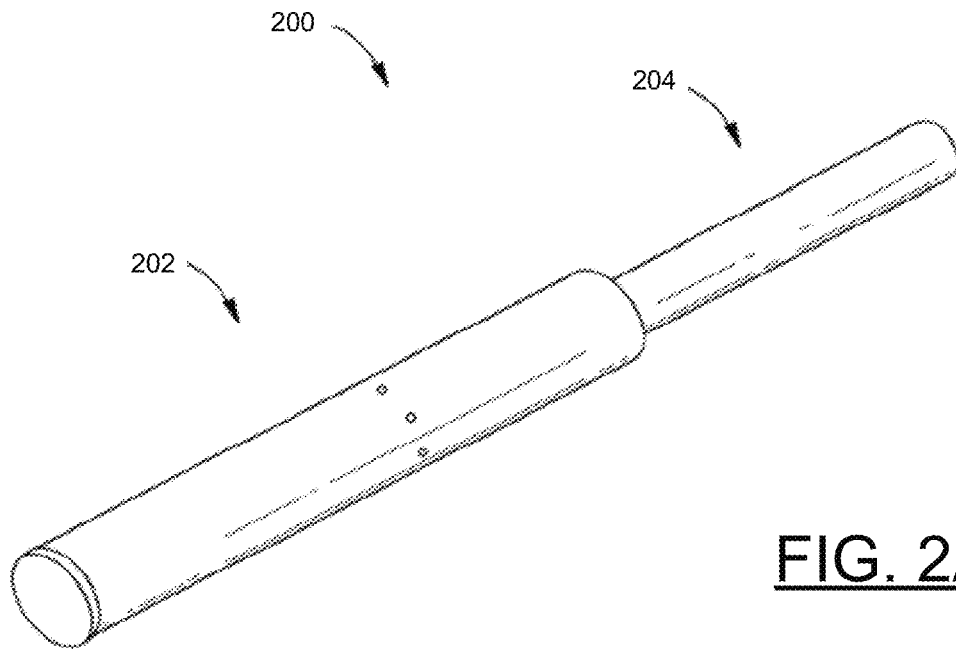
FIGS. 2A, 2B and 2C illustrate an aerosol provision system in the form of a heat-not-burn product, according to some example implementations.
Figure 2B:
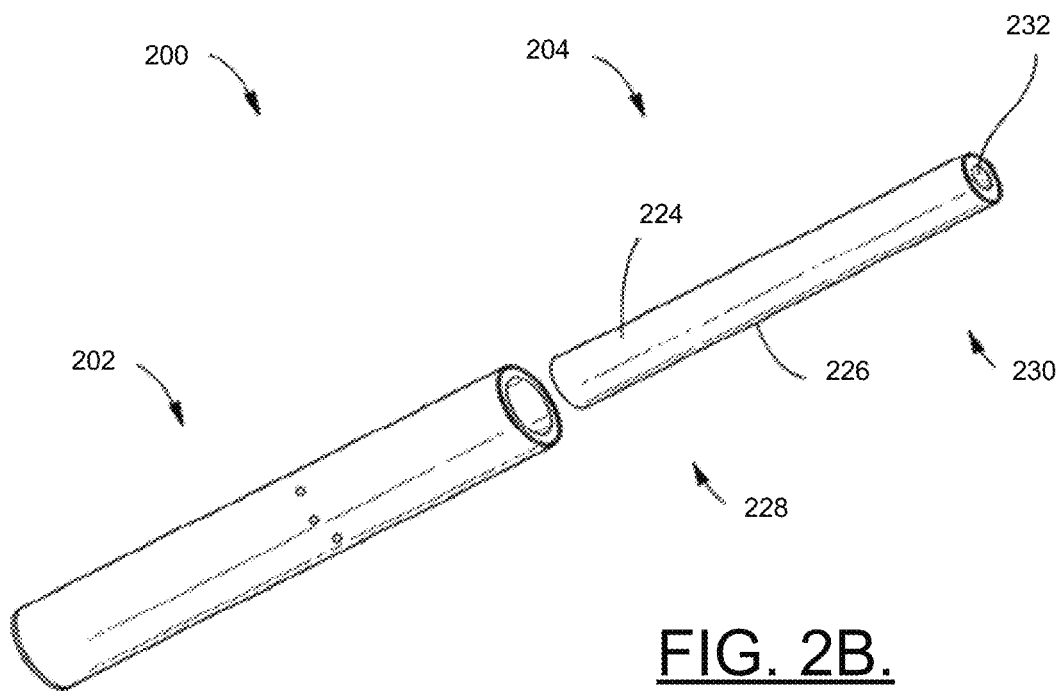
Figure 2C:
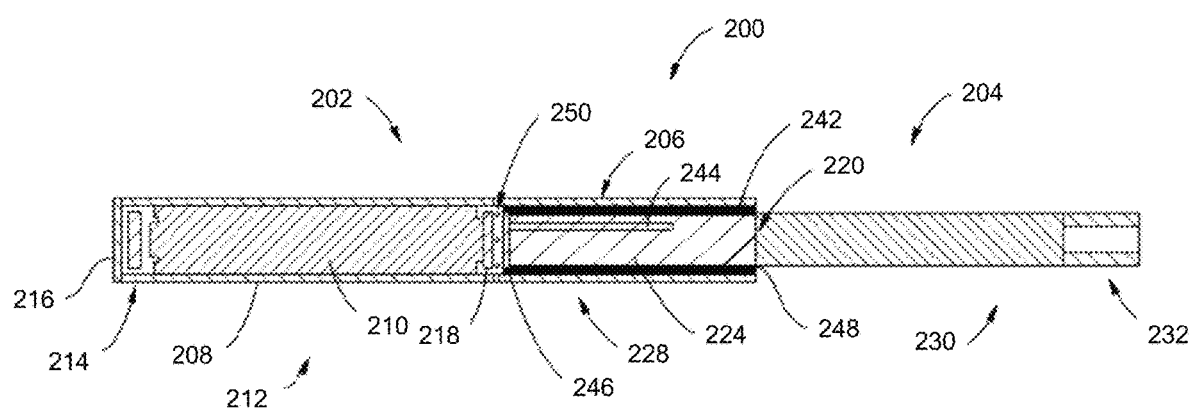

FIGS. 2A, 2B and 2C illustrate an aerosol provision system 200 in the form of a heat-not-burn product, and that in some example implementations may correspond to the aerosol provision system 100. As shown, the aerosol provision system may include an aerosol provision device 202 (also referred to as a control body or power unit) and a consumable 204 (also referred to as an aerosol source member or cartridge), which may correspond to respectively the aerosol provision device 102 and the consumable 104. The aerosol provision system and in particular the aerosol provision device may also include an aerosol generator corresponding to the aerosol generator 106, and in the form of an electric heater 206. The aerosol provision device and the consumable can be permanently or detachably aligned in a functioning relationship. FIG. 2A illustrates the aerosol provision system in a coupled configuration, whereas FIG. 2B illustrates the aerosol provision system in a decoupled configuration. FIG. 2C illustrates a partially cut-away side view of the aerosol provision system in the coupled configuration.

As seen in FIGS. 2A, 2B and 2C, the aerosol provision device 202 and consumable 204 each include a number of respective components. The components illustrated in the figures are representative of the components that may be present in an aerosol provision device and consumable and are not intended to limit the scope of components that are encompassed by the present disclosure.

The aerosol provision device 202 may include a housing 208 (sometimes referred to as an aerosol provision device shell) that may include a power source 210. The housing may also include circuitry 212 with a switch in the form of a sensor 214, a user interface including a light source 216 that may be illuminated with use of the aerosol provision system 200, and processing circuitry 218 (also referred to as a control component). In some examples, at least some of the electronic components of the circuitry may be formed of a circuit board or a flexible circuit board that supports and electrically connects the electronic components.

The housing 208 may also include a receptacle in the form of a consumable receiving chamber 220 structured to engage and hold the consumable 204. The consumable 204 may include an aerosol-generating material 224 that may correspond to aerosol-generating material 124, and that may include one or more of each of a number of constituents such as an active substance, flavorant, aerosol-former material or other functional material. And the aerosol-generating material may be present on or in a support to form a substrate 226.

In the coupled configuration of the aerosol provision system 200, the consumable 204 may be held in the receiving chamber 220 in varying degrees. In some examples, less than half or approximately half of the consumable may be held in the receiving chamber 220. In other examples, more than half of the consumable 204 may be held in the receiving chamber 220. In yet other examples, substantially the entire consumable 204 may be held in the receiving chamber 220.

As shown in FIGS. 2B and 2C, in various implementations of the present disclosure, the consumable 204 may include a heated end 228 sized and shaped for insertion into the aerosol provision device 202, and a mouth end 230 upon which a user draws to create the aerosol. In various implementations, at least a portion of the heated end may include the aerosol-generating material 224.

In some example implementations, the mouth end 230 of the consumable 204 may include a filter 232 made of a material such as cellulose acetate or polypropylene. The filter may additionally or alternatively contain strands of tobacco containing material. In some examples, at least a portion of the consumable may be wrapped in an exterior overwrap material, which may be formed of any material useful to provide additional structure, support and/or thermal resistance. In some examples, an excess length of the overwrap at the mouth end of the consumable may function to simply separate the aerosol-generating material 224 from the mouth of a user or to provide space for positioning of a filter material, or to affect draw on the consumable or to affect flow characteristics of the aerosol leaving the consumable during draw.

The electric heater 206 may perform electric heating of the aerosol-generating material 224 by resistance (Joule) heating, induction heating, dielectric and microwave heating, radiant heating, arc heating and the like. The electric heater may have a variety of different configurations. In some examples, at least a portion of the electric heater may surround or at least partially surround at least a portion of the consumable 204 including the aerosol-generating material when inserted in the aerosol provision device 202. In other examples, at least a portion of the electric heater may penetrate the consumable when the consumable is inserted into the aerosol provision device. In some examples, the substrate 226 material may include a susceptor, which may be embedded within the aerosol-generating material, or on one or either side of the aerosol-generating material.

Although shown as a part of the aerosol provision device 202, the electric heater 206 may instead be a part of the consumable 504. In some examples, the electric heater or a part of the electric heater may be may be combined, packaged or integral with (e.g., embedded within) the aerosol-generating material 224.

As shown, in some examples, the electric heater 206 may extend proximate an engagement end of the housing 208, and may be configured to substantially surround a portion of the heated end 228 of the consumable 204 that includes the aerosol-generating material 224. The electric heater 206 may be or may include an outer cylinder 242, and one or more resistive heating elements 244 such as prongs surrounded by the outer cylinder to create the receiving chamber 220, which may extend from a receiving base 246 of the aerosol provision device to an opening 248 of the housing 208 of the aerosol provision device. In some examples, the outer cylinder may be a double-walled vacuum tube constructed of stainless steel so as to maintain heat generated by the resistive heating element(s) within the outer cylinder, and more particularly, maintain heat generated by the resistive heating element(s) within the aerosol-generating material.

Like the electric heater 206, the resistive heating element (s) 244 may have a variety of different configurations, and vary in number from one resistive heating element to a plurality of resistive heating elements. As shown, the resistive heating element(s) may extend from a receiving base 246 of the aerosol provision device 202. In some examples, the resistive heating element(s) may be located at or around an approximate radial center of the heated end 228 of the consumable 204 when inserted into the aerosol provision device. In some examples, the resistive heating element(s) may penetrate into the heated end of the consumable and in direct contact with the aerosol-generating material. In other examples, the resistive heating element(s) may be located inside (but out of direct contact with) a cavity defined by an inner surface of the heated end of the consumable.

In some examples, the resistive heating element(s) 244 of the electric heater 206 may be connected in an electrical circuit that includes the power source 210 such that electric current produced by the power source may pass through the resistive heating element(s). The passage of the electric current through the resistive heating element(s) may in turn cause the resistive heating element(s) to produce heat through resistance (Joule) heating.

In other examples, the electric heater 206 including the outer cylinder 242 and the resistive heating element(s) 244 may be configured to perform induction heating in which the outer cylinder may be connected in an electrical circuit that includes the power source 210, and the resistive heating element(s) may be connected in another electrical circuit. In this configuration, the outer cylinder and resistive heating element(s) may function as a transformer in which the outer cylinder is an induction transmitter, and the resistive heating element(s) is/are an induction receiver. In some of these examples, the outer cylinder and the resistive heating element(s) may be parts of the aerosol provision device 202. In other of these examples, the outer cylinder may be a part of the aerosol provision device, and the resistive heating element(s) may be a part of the consumable 204.

The outer cylinder 242 may be provided with an alternating current directly from the power source 210, or indirectly from the power source in which an inverter (as part of the circuitry 212) is configured to convert direct current from the power source to an alternating current. The alternating current drives the outer cylinder to generate an oscillating magnetic field, which induces eddy currents in the resistive heating element(s) 244. The eddy currents in turn cause the resistive heating element(s) to generate heat through resistance (Joule) heating. In these examples, the resistive heating element(s) may be wirelessly heated to form an aerosol from the aerosol-generating material 224 positioned in proximity to the resistive heating element(s).

In various example implementations, the aerosol provision device 202 may include an air intake 250 (e.g., one or more openings or apertures) in the housing 208 (and perhaps also the receiving base 246) to enable airflow into the receiving chamber 220. When a user draws on the mouth end 228 of the consumable 204, the airflow may be drawn through the air intake into the receiving chamber, pass into the consumable, and be drawn through the aerosol-generating material 224. The airflow may be detected by the sensor 214, and the electric heater 206 may be activated to energize the aerosol-generating material to generate an aerosol. The airflow may combine with the aerosol that is whisked, aspirated or otherwise drawn out an opening at the mouth end of the aerosol provision system. In examples including the filter 232, the airflow combined with the aerosol may be drawn out an opening of the filter at the mouth end.

Figure 3:
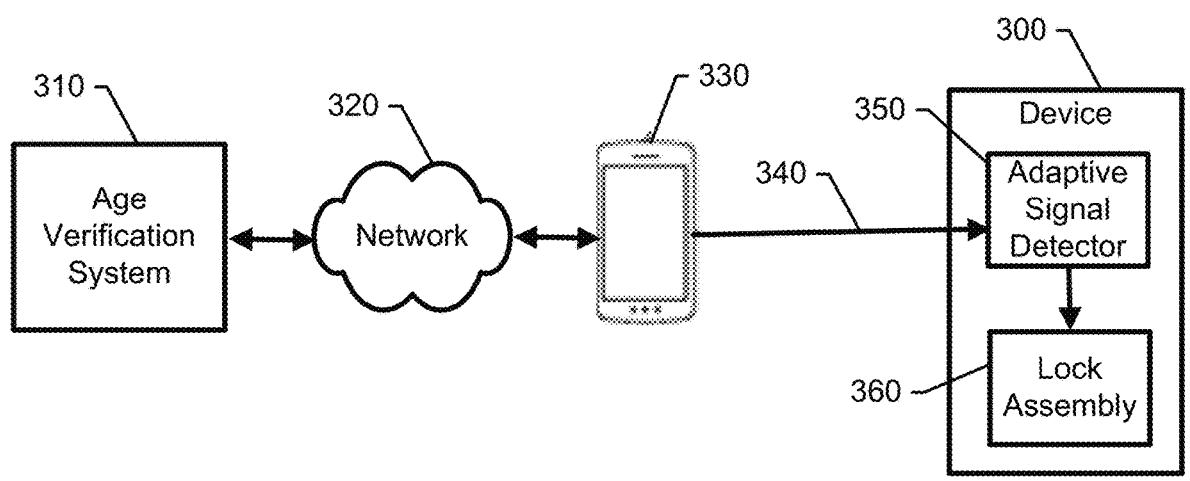
FIG. 3 is a block diagram of an example implementation of devices associated with a PSA process in accordance with an example embodiment.
Figure 4:
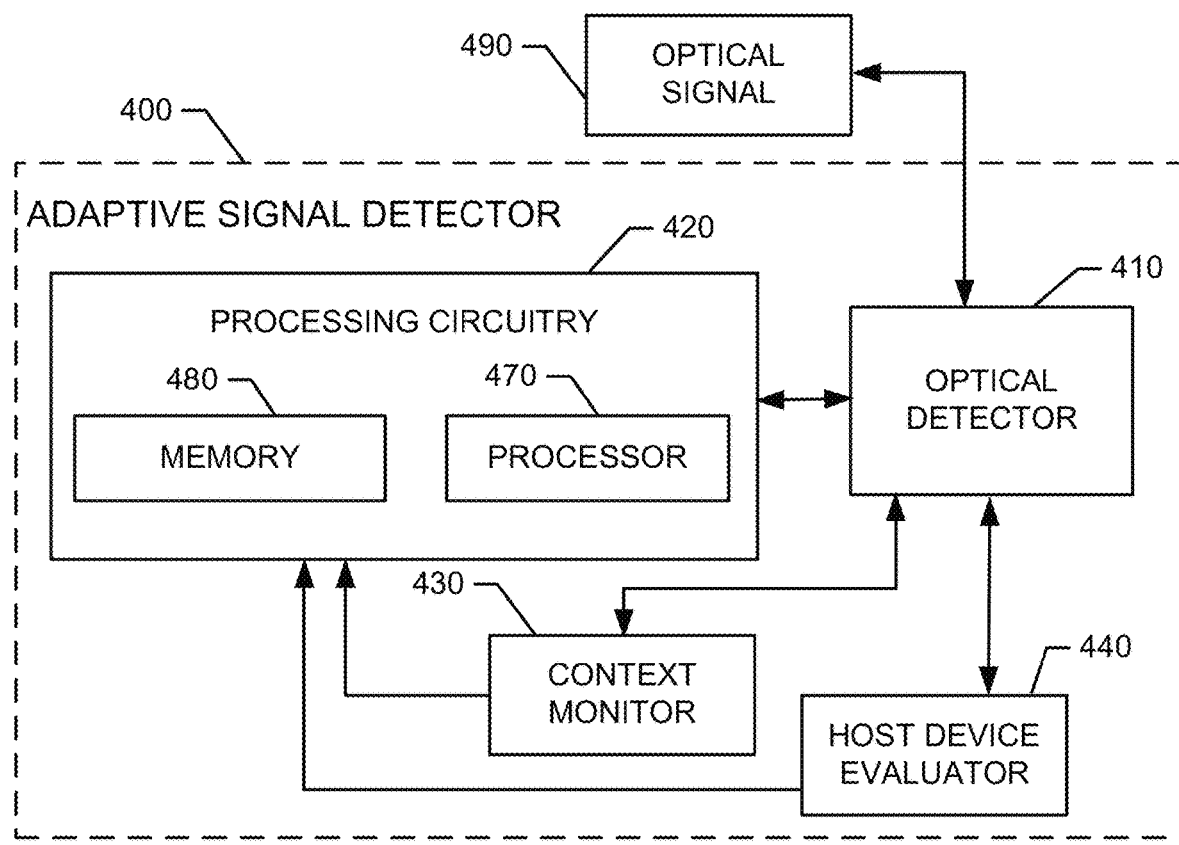
FIG. 4 is a block diagram of an adaptive signal detector in accordance with an example embodiment.

As noted above, PSA may be desirable after purchase or acquisition of the aerosol provision devices 102/202 of FIGS. 1 and 2, or other devices like them. FIG. 3 illustrates an example system diagram for functional control of a device 300 (which may be an example of the aerosol provision devices 102/202 of FIGS. 1 and 2) for PSA in accordance with an example embodiment. In this regard, FIG. 3 illustrates how the device 300 communicates with an age verification system 310 through a network 320 and a host device 330, in order to verify the user's age, which may also be used to authenticate the device 300 periodically. The device 300 may be in a locked state (e.g., in which the device 300 is unusable or such usage is strictly controlled) until authenticated properly via the PSA process. After authentication, the device 300 may be unlocked and operate normally. The age verification system 310 may be operably coupled with the host device 330 over the network 320. Although not shown, the age verification system 310 may be coupled with the device 300 over the network 320.

The device 300 may be any aerosol delivery device, including for example an electronic nicotine delivery systems ("ENDS") device according to various embodiments described above. In one embodiment, the age verification system 310 may not only verify an age (e.g. for an age restricted product), but may also provide authentication or user identification (e.g. for an actual purchase or to prevent theft). An example of the authentication and age verification by the age verification system 310 is further described in U.S. patent application Ser. No. 16/415,460, entitled "AUTHENTICATION AND AGE VERIFICATION FOR AN AEROSOL DELIVERY DEVICE," which claims priority to U.S. Provisional App. No. 62/282,222 on Apr. 2, 2019, the entire disclosures of each of which are hereby incorporated by reference. The authentication described below may rely on age verification being performed first and then referenced for subsequent authentication using a control signal 340 sent to the device 300. However, there may be other verification mechanisms other than age. For example, in some embodiments, user identification may be performed in lieu of age verification. Thus, for example, the age verification system 310 is more generally simply an example of an authorization system that is configured to conduct PSA for the device 300, and the age verification system 310 may therefore more generally be referred to as an authentication agent. Cartridges or consumables may be registered as part of the age verification or authentication process as described in U.S. patent application Ser. No. 16/415,444, entitled "AGE VERIFICATION WITH REGISTERED CARTRIDGES FOR AN AEROSOL DELIVERY DEVICE," filed on May 17, 2019, the entire disclosure of which is herein incorporated by reference. U.S. Pat. No. 8,689,804 to Fernando et al. discloses identification systems for smoking devices, the disclosure of which is being incorporated herein by reference.

The age verification system 310 may include a database that tracks users along with ages, as well as maintains a record of the devices and components (e.g. cartridges) along with approvals. It may be encrypted and/or use anonymous identifiers (e.g. numbers, letters, or any alphanumeric identifiers) for each user.

The initial age verification may occur and be stored in the database, such as may be maintained at the age verification system 310 and/or otherwise accessible over the network 320. In some embodiments, age verification records may be maintained using blockchain technology. Future age verification requests by that user may be confirmed by calling the database. Specifically, once a user is initially age verified as confirmed in the age verification system database, future verifications (i.e. "authentications") may be merely calls to this database for unlocking the device 300. In other words, a user initially performs an age verification and then subsequent usage may require authentication without the complete initial age verification requirements. The frequency with which the device 300 must be unlocked or authenticated can vary. Likewise, the timing for when a user needs to re-verify their age (or otherwise re-authenticate themselves) may vary. For example, each time the cartridge is replaced, the user may need to re-verify or re-authenticate. In some embodiments, the re-authentication may be required after a certain number of puffs from the device 300 or may be based on the passage of time (e.g. once per hour, day, week, month, etc.). The online database may track the requests for authentication and set limits per user. This can prevent the potential fraud of a single user unlocking other under-age user's devices. This also would prevent the re-distribution of unlocked (i.e. verified and authenticated) devices and/or accessories. Reasonable limits for the number of devices, chargers, consumables, and/or authentications can prevent this potential fraud.

A user profile may be stored (e.g. on the device 300 or from an application or app on a host device 330) that includes an age verified identity for the user. An app on the host device 330 may access the user profile over a network, such as the network 320. Once a user is initially age verified as confirmed in the age verification system database, the user profile for that user may be generated and saved so that future verifications (i.e. "authentications") may be merely calls to this database. In one embodiment, the age verification may be a prerequisite for the host device 330 to be able to generate and submit the control signal 340 to the device 300.

The host device 330 may be any computing or communication device, such as a smartphone, tablet, cellular phone, analog phone, or computer. The host device 330 may communicate with or provide the control signal 340 to the device 300 for authentication or activation. The control signal 340 from the host device 320 to the device 300 may be a wired or a wireless signal such as, for example an RF signal, a vibratory signal, an audio signal or a light/optical signal. Optical signals should be understood to include those in the visible light spectrum, but also infra-red signals, fiber optic signals, ultraviolet light signals as well as signals associated with intensity tuning or wavelength tuning. Audible signals should be understood to include those in and outside the audible range for humans. Moreover, audible signals that employ decibel tuning or frequency tuning may also be included. In some embodiments, the host device 330 may therefore couple audibly or optically with the device 300 in order to communicate the control signal 340 to authenticate and/or unlock the device 300. Thus, the ability of the host device 330 with respect to transmission of the control signal 340, and the environmental factors that may impact receipt of the control signal 340 at the device 300 are all important to successful authentication or authorization of the device 300.

To the extent a user obtains the device 300 and attempts to perform PSA in the manner generally described above, but the attempted PSA fails due to limitations of the host device 330 or environmental factors, the user may become irritated or annoyed. Meanwhile, if the PSA attempt proceeds smoothly for the user, the likelihood of user satisfaction, positive reviews, and continued sales of such devices may be increased. Thus, to provide a higher likelihood of a positive user experience associated with PSA, example embodiments may provide the device 300 with an adaptive signal detector 350 as described in greater detail below. In this regard, the adaptive signal detector 350 may be configured to adaptively process the control signal 340 based on device characteristics of the host device 330 and/or environmental conditions that, in either case, are determinable by the adaptive signal detector 350. In other words, the adaptive signal detector 350 may be configured to assess the host device 330 while receiving the control signal 340 including an unlock code therein and/or determine environmental conditions that may impact transmission/receipt of the control signal 340. The adaptive signal detector 350 may then adjust its own settings in order to better process the control signal 340 to utilize the unlock code therein for PSA. Thus, in a context in which the control signal 340 is an optical signal, audio signal, an RF signal or a vibratory signal, it should be appreciated that the adaptive signal detector 350 is configured to process the control signal 340 to determine device characteristics and/or environmental factors that may impact reception of the control signal 340 and adjust or tune receiving circuitry of the adaptive signal detector 350 to enable better reception of the optical, audio, RF or vibratory signal, respectively, for processing of the unlock code in the control signal 340. Moreover, sometimes the control signal 340 may include a combination of any of the above-listed signal types, and the tuning may therefore also include a combination of receivers that can be tuned accordingly. A more detailed example involving an optical signal will be described below, but the principles represented by the example extend also to the other signal types.

The device 300 may also include a lock assembly 360 that prevents operation of the device 300 for generating an aerosol when the device 300 is in a locked state, and enables operation of the device 300 for generating the aerosol when the device 300 is in an unlocked state. For example, when in the locked state, the lock assembly configured to prevent operation of the aerosol generator 106 of FIG. 1 with respect to generating the aerosol, and enable operation of the aerosol generator 106 for generating the aerosol in the unlocked state. The lock assembly 360 may be the last step in the PSA process, and may apply the unlock code (or unique code) provided in the control signal 340 to transition from the locked state to the unlocked state if the unlock code is authenticated. As such, the adaptive signal detector 350 may receive the control signal 340 and process the control signal 340 using adaptive techniques described herein. The unlock code from the control signal 340 may be provided to the lock assembly 360 and, if authenticated, enable the device 300 to be shifted to the unlocked state to enable aerosol generation, thereby successfully completing the PSA process.

As noted above, the control signal 340 may be a wireless signal that may be, for example, optical or audible. General information regarding processing the control signal 340 as an optical signal is provided in U.S. patent application Ser. No. 16/441,937, entitled "FUNCTIONAL CONTROL AND AGE VERIFICATION OF ELECTRONIC DEVICES THROUGH VISUAL COMMUNICATION," filed on Jun. 14, 2019, the entire disclosure of which is herein incorporated by reference. Similarly, information regarding processing the control signal 340 as an audible signal is provided in U.S. patent application Ser. No. 16/441,903, entitled "FUNCTIONAL CONTROL AND AGE VERIFICATION OF ELECTRONIC DEVICES THROUGH SPEAKER COMMUNICATION," filed on Jun. 14, 2019, the entire disclosure of which is herein incorporated by reference. The adaptive signal detector 350 may be configured to provide adaptive processing for the control signal 340 in either context. However, to provide an example of how the adaptive signal detector 350 of some embodiments may be structured, FIG. 4 will be used to describe a specific example in which the control signal 340 is an optical signal.

Accordingly, FIG. 4 illustrates a block diagram of an adaptive signal detector 400, which may be one example implementation of the adaptive signal detector 350 of FIG. 3 that is configured for conducting PSA in connection with the control signal 340 of FIG. 3 being embodied as an optical control signal. Referring now to FIG. 4, the adaptive signal detector 400 may include an optical detector 410 operably coupled to detection circuitry embodied as processing circuitry 420. The adaptive signal detector 400 may also include one or both of a context monitor 430 and a host device evaluator 440.

In an example embodiment, the adaptive signal detector 350 (and more particularly the processing circuitry 420) may include a processor 470 and memory 480. The processing circuitry 420 may be configured to perform data processing, control function execution and/or other processing and management services according to an example embodiment of the present invention. In some embodiments, the processing circuitry 420 may be embodied as a chip or chip set. In other words, the processing circuitry 420 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The processing circuitry 420 may therefore, in some cases, be configured to implement an embodiment of the present invention on a single chip or as a single "system on a chip." As such, in some cases, a chip or chipset may constitute means for performing one or more operations for providing the functionalities described herein.

In an example embodiment, the processing circuitry 420 may be embodied as a circuit chip (e.g., an integrated circuit chip) configured (e.g., with hardware, software or a combination of hardware and software) to perform operations described herein. However, in some embodiments, the processing circuitry 420 may be embodied as a portion of an on-board computer.

The processor 470 may be embodied in a number of different ways. For example, the processor 470 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. In an example embodiment, the processor 470 may be configured to execute instructions stored in the memory 480 or otherwise accessible to the processor 470. As such, whether configured by hardware or by a combination of hardware and software, the processor 470 may represent an entity (e.g., physically embodied in circuitry—in the form of processing circuitry 420) capable of performing operations according to embodiments of the present invention while configured accordingly. Thus, for example, when the processor 470 is embodied as an ASIC, FPGA or the like, the processor 470 may be specifically configured hardware for conducting the operations described herein. Alternatively, as another example, when the processor 470 is embodied as an executor of software instructions, the instructions may specifically configure the processor 470 to perform the operations described herein.

In an example embodiment, the processor 470 (or the processing circuitry 420) may be embodied as, include or otherwise control the operation of the adaptive signal detector 400 based on inputs received by the processing circuitry 420 and programming stored in the memory 480. As such, in some embodiments, the processor 470 (or the processing circuitry 310) may be said to cause each of the operations described in connection with the optical detector 410, the context monitor 430 and the host device evaluator 440.

In an exemplary embodiment, the memory 480 may include one or more non-transitory memory devices such as, for example, volatile and/or non-volatile memory that may be either fixed or removable. The memory 480 may be configured to store information, data, applications, instructions or the like for enabling the processing circuitry 420 to carry out various functions in accordance with exemplary embodiments of the present invention. For example, the memory 480 could be configured to buffer input data for processing by the processor 470. Additionally or alternatively, the memory 480 could be configured to store instructions for execution by the processor 470. As yet another alternative, the memory 480 may include one or more databases that may store a variety of data sets responsive to inputs received. Among the contents of the memory 480, applications and/or instructions may be stored for execution by the processor 470 in order to carry out the functionality associated with each respective application/instruction. In some cases, the applications may include instructions for providing inputs to control operation of the optical detector 410, the context monitor 430 and the host device evaluator 440 as described herein.

In an example embodiment, the optical detector 410 may include a light sensor, a photodiode, a reader, and/or an infrared detector. The light sensor may include any light dependent resistive elements. These types of resistive elements may change in resistance due to the presence or absence of light. This may require current to flow through the resistive element when an optical signal 490 (e.g., an authentication light sequence) is being transmitted. The photodiode may include sensors that generate a small current when exposed to a light source, and may act as a switch with a relatively fast response time.

If a reader is employed, the reader may be embodied as a camera, or other light detector. In one example, the user may capture a picture of a unique code (e.g., bar code) generated at the display of the host device 330. Example bar codes may include any type of scannable identifier, such as a universal product code (UPC), data matrix code, and/or a quick response (QR) code. The code may include any one-dimensional (1D) codes, two-dimensional (2D) codes, three-dimensional (3D) codes, or other types of codes. In other examples, a light sequence providing the unique code may be provided. In either case, the unique code may be part of the optical signal 490 and may be decoded by the processing circuitry 420. If the unique code is authentic, the processing circuitry 420 may unlock or otherwise enable usage of the device 300.

In this regard, for example, the optical signal 490 may be generated by the display (e.g. light/color arrangement on the screen or pulses from the display) or by a flashlight (e.g. a rear facing flashlight on a mobile device or other computing device) of the host device 330. The display may be placed near the optical detector 410 of the device 300 for detecting any colors/pulses/patterns or sequences that are shown in the display screen. In the example of the host device 330 including a flashlight application, an app could be programmed to cause the flashlight to transmit light according to a specific pattern or sequence that provides the unique code within the optical signal 490.

The intensity of light may be greater for a flashlight than for a typical display, which may impact the chance of signal loss during transmission. Moreover, if the device 300 is in a bright or dark environment, or if the environment changes during a transmission, these situations may impact the ability of the processing circuitry 420 to process the information gathered by the optical detector 410. Other challenges impacting the transfer of an optical signal may also relate to the capabilities of the host device 330. For example, certain challenges and variability may exist relating to detecting the start and/or end of a signal, determining edges in signals transmitted, speed and timing issues related to display capabilities that could stretch certain signals, noise, etc. To improve the accuracy and reliability of the efforts made by the device 300 for PSA, the adaptive signal detector 400 may be configured to have improved capabilities (and flexible configurations to support) for detecting signal start/end, for detecting edges in signals (e.g., via automatic threshold detection), for employing flexible duration limits, for employing timing calibration, and/or for utilizing iterative attempts. Descriptions of examples of various ones of these improvements will now follow to illustrate an example embodiment.

Figure 5:
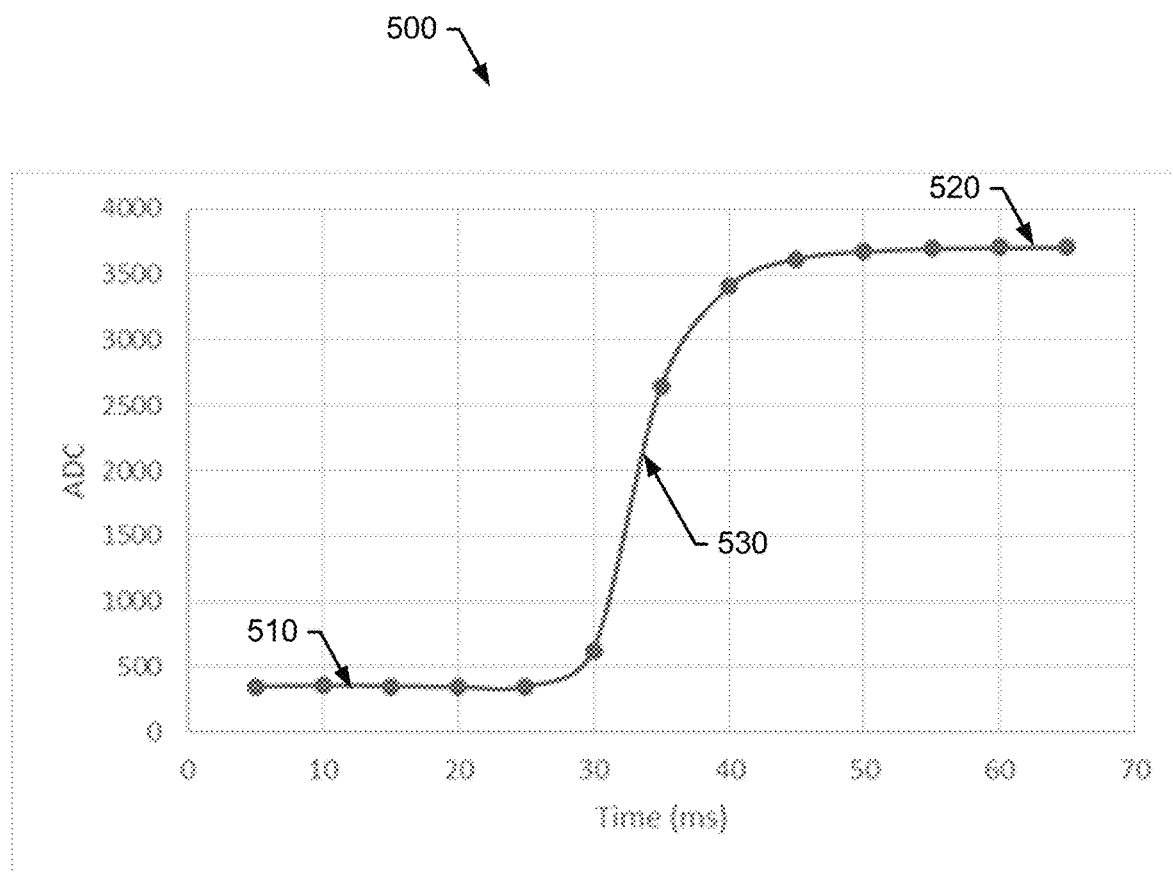
FIG. 5 is a plot of rise time variance that can impact unlock code extraction in accordance with an example embodiment.

In this regard, the detection of the start and end of a signal at one device may be impacted by the ability of the transmitting device to accurately represent the signal based on start and/or rise time limitations inherent in the transmitting device. For example, if the host device 330 is not able to accurately transition between white and black to transmit the unique code within the optical signal 490, the device 300 may have a difficult time discerning the start and end times for individual code segments of the unique code. FIG. 5 illustrates a plot 500 of a transition from a low (or black) value 510 to a high (or white) value 520, which may drive colors generated on a display of the host device 330. The period of time that the device takes to settle into the new value is a transition period 530. In the example of FIG. 5, the transition period 530 is about 15 ms in length. However, some example devices may have as much as a 25 ms delay (or more). Depending on the specific timing of the transition period 530, there could be a 5 to 10 ms difference from the expected duration of a coded symbol. Differences of this magnitude may result in significant failure rates in relation to reading the unique code due to symbols of the unique code being misread at the device 300.

Figure 6:
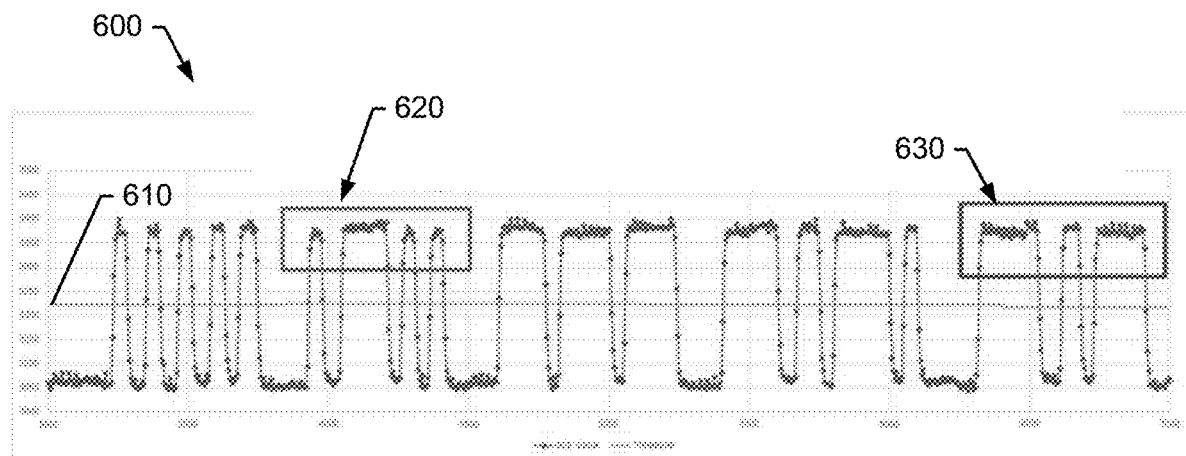
FIG. 6 is a plot of symbols showing how inconsistent playback speed can impact unlock code extraction in accordance with an example embodiment.

In addition to the transition period 530 being capable of throwing off the ability of the processing circuitry 420 to properly process the unique code, image playback speed may also be impactful. For example, if the unique code is sent on a device with a slower frame rate than expected, the unique code may appear to be stretched (and therefore different) at the receiving end. Similarly, any fluctuations in playback speed can impact decoding accuracy. FIG. 6 illustrates an example unlock code sequence 600 associated with the unique code being transmitted on a device. FIG. 6 shows a transition threshold 610, which is used to distinguish high from low signals, and also shows the timing associated with the transmission of the unlock code sequence along the x-axis. As shown in FIG. 6, a first region 620 may illustrate normal timing and playback speed for the unlock sequence code 600. However, in a second region 630, the individual characters are stretched due to a change in the playback speed during the communication of the unlock sequence code 600. The change in playback speed may be due to processing load associated with other applications or tasks being handled by the processor of the host device 330. However, regardless of the reason, the stretching of the timing may cause the unique code to not be properly processed since the same individual character may not look the same at two different speeds.

Figure 7:
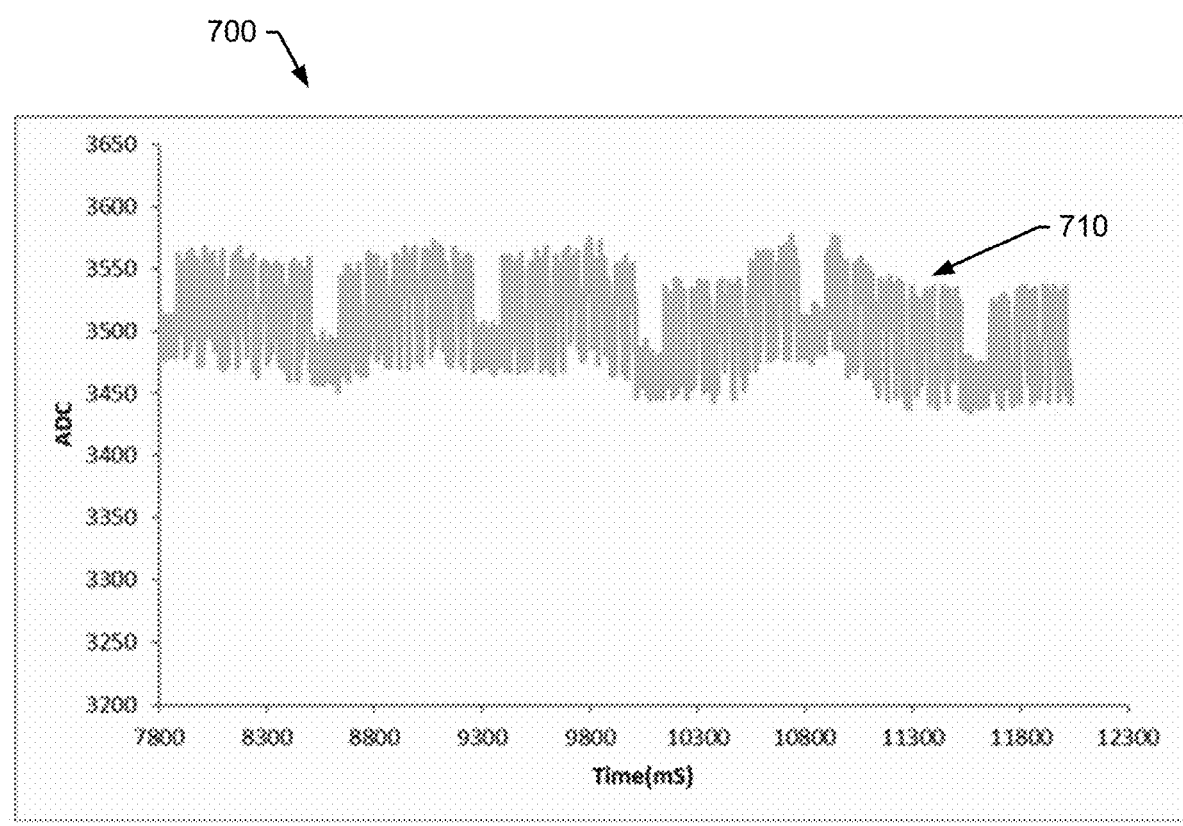
FIG. 7 is a plot of symbols received in a changing ambient lightings context which can impact unlock code extraction in accordance with an example embodiment.

Changes in ambient lighting during the unlock sequence can cause the measured waveform (at the processing circuitry 420) to shift up or down. This phenomenon may be problematic in conditions where the readings of the black and white image portions are close together. In extreme cases, this could cause the overall waveform to shift by an amount greater than the difference between the black and white readings. FIG. 7 illustrates a plot 700 of code symbols of an unlock code 710 being displayed in an environment in which ambient lighting conditions are changing. In this regard, the unlock code would normally be expected to define a square wave with all high and low values being the same. However, in FIG. 7, the unlock code 710 can be seen to change level in the middle of various code segments creating distortions that almost make some of the square waves look instead like triangle waves.

Figure 8:
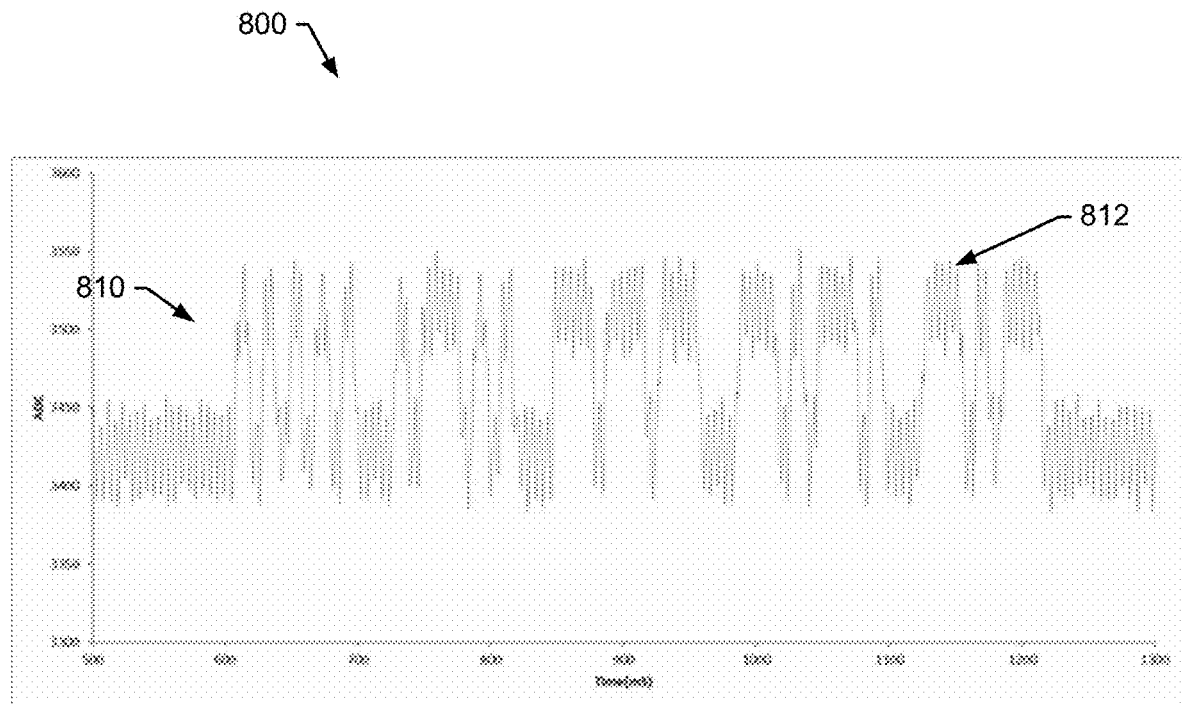
FIG. 8 is a plot of symbols showing how noise can impact unlock code extraction in accordance with an example embodiment.

Noise may also impact the optical signal 490. For example, in indoor settings, lighting provided by light fixtures may have AC signal noise components that are driven by the frequency at which the lights cycle. FIG. 8 illustrates a plot 800 of code symbols of an unlock code 810 being received with a 60 Hz noise component 812 overlaid thereon. For brighter lights, the noise can be even more impactful, and may negatively affect the ability of the processing circuitry 420 to accurately process the unique code provided by the unlock code 810.

In order to deal with these and potentially other situations, the adaptive signal detector 400 may employ either or both of the context monitor 430 and the host device evaluator 440 in order to enable the processing circuitry 420 to adapt to conditions that may impact reception and processing of the optical signal 490. The adaptations may include adjustments that are made responsive to stimuli that may be detected by the context monitor 430 in some cases. However, in other cases (or additionally), the adaptations may include processing strategies and/or enhancements that are enabled by the host device evaluator 440 to provide improved capability to handle interactions with devices of varying capabilities. Moreover, in some cases, the enhancements may be initiated based on knowledge gained about those varying capabilities. In other words, the enhancements may be made based on an assessment of the capabilities of the host device 330. Thus, for example, the host device evaluator 440 and/or the context monitor 430 may provide information that may form the basis for tuning of the processing circuitry 420 in order to provide improved accuracy with respect to extracting the unlock code from the optical signal 490 regardless of the environment or host device that is being used in the PSA process.

The context monitor 430 may be any means such as a device or circuitry embodied in either hardware, or a combination of hardware and software that is configured to enable tuning of the processing circuitry 420 for extracting the unlock code from the optical signal 490 by determining environmental context information such as information relating to lighting levels/intensity, noise, or changes in either lighting or noise during transmission of the optical signal 490. Thus, for example, the context monitor 430 may be configured to determine a change in ambient lighting that occurs during transmission of the optical signal 490 (e.g., by comparing levels at but not limited to, the beginning (e.g., in a preamble) of transmission to levels at the end (e.g., in a postamble)). In an example embodiment, the context monitor 430 may be configured to detect edges in the optical signal based on detecting changes in intensity in light instead of simply detecting light intensity levels themselves. In some cases, the context monitor may be further configured to detect edges in the optical signal based on automatic threshold detection via a comparison of an average level of a given number of prior symbols to a threshold defined as a percentage of the average level to consider context instead of simply applying information to a fixed threshold. Detection of changes or edges may also be accomplished in other ways. For example, a magnitude of a potential edge may be measured and compared to the magnitude of previously detected edges in order to determine whether the potential edge should be considered to be an edge. As such, for example, edge detection may be conducted on the basis of comparing signals to a threshold value, detecting slope characteristics of potential edges in order to determine whether such potential edges qualify as a detected edge, and detecting the magnitude of edges as noted above.

The host device evaluator 440 may be any means such as a device or circuitry embodied in either hardware, or a combination of hardware and software that is configured to enable tuning of the processing circuitry 420 for extracting the unlock code from the optical signal 490 by determining host device characterization information. The host device characterization information may be any information about the host device including, for example, information indicative of device type or the capabilities of the host device 330 with respect to playing back the unlock code within the optical signal. The host device evaluator 440 may be configured to use any of a number of strategies for determining host device characterization information. For example, the host device evaluator 440 may be configured to determine the host device characterization information at the beginning of transmission of the optical signal, use such information throughout the transmission and make a comparison at the end for success criteria. Alternatively, the host device evaluator 440 may be configured to determine the host device characterization information at the beginning of transmission of the optical signal and make a comparison at the end for success criteria. Additionally or alternatively, the host device characterization information could be determined from signal portions that can be used for obtaining such information, and these signal portions may be distributed anywhere in the optical signal. Additionally or alternatively, a preamble may be used at a start of the optical signal to start a tuning process that may be adjusted dynamically throughout transmission of the optical signal. Thus, for example, either or both of a preamble or a postamble to determine useful information for characterizing the capabilities of the host device 330 to enable the processing circuitry 420 to be tuned accordingly. However, it should be appreciated that example embodiments are not limited to using information at the beginning and end of an unlock code and can be encompassed within the optical signal at any defined instant. For example, the host device evaluator 440 may be configured to determine a code version used in the unlock code or perform timing calibration based on a distinct waveform included in the optical signal. As another example, the host device evaluator 440 may be configured to detect start and/or end symbols at the front/rear of the unlock code to allow deductive reasoning to be employed (either through comparing multiple code transmissions or a checksum) to find missing characters. Other capabilities may also be defined, as described below in greater detail.

One of the adaptations that the adaptive signal detector 400 may be configured to implement may include the inclusion of a preamble or postamble in the optical signal 490. The preamble may be a framing layer that may be provided at the beginning of the optical signal 490 to enable an assessment of the capabilities of the host device 330 prior to communication of the unique code. The preamble may be processed by the context monitor 430 and/or the host device evaluator 440 to provide feedback to the processing circuitry 420 to facilitate processing the unique code (i.e., the unlocking code) within the optical signal 490. As an alternative to or an addition to the preamble, a postamble may be provided to the end of the optical signal 490. The postamble may also be useable to assess the capabilities of the host device 330, and to compare to the preamble to determine any context changes that may have occurred during the transmission of the optical signal 490 (e.g., large changes in ambient lighting magnitude or noise). Furthermore, a check can be assessed within the code and compared back to the preamble/postamble or both within the optical signal 490 to assess the capabilities of the host device 330.

In some cases, the preamble and/or postamble may include a square wave (or other distinct waveform) that may be sent to be used for timing calibration. If the optical signal 490 is provided with a preamble/postamble code having a given number of pulses, and the processing circuitry 420 (e.g., via the host device evaluator 440) uses the same number of pulses for the same expected duration, the processing circuitry 420 can use the preamble/postamble code to calibrate its timing parameters to match the signal. The preamble/postamble will necessarily add to the length of the optical signal 490, and therefore could slightly slow down the reception of any single coded signal. However, the use of the preamble and/or postamble may ultimately reduce the transfer time overall due to increased robustness and accuracy (i.e., eliminating the need for multiple efforts at PSA).

If employed, the preamble may also be used to differentiate between different versions of a code. For example, the host device 330 may be identified to the age verification system 310, and the age verification system 310 may provide a code that is tailored to the host device 330 based on type classification associated with the identity of the host device 330. The host device 330 may thereafter provide either a slower version of the code or a faster version of the code to the device 300. The device 300 may utilize the preamble to detect which version of the code to expect from the host device 330. Thus, the device 300 may utilize the adaptive signal detector 400 to learn something about the code provided in the optical signal 490 before attempting to utilize the code for unlocking the device 300. In some cases, the preamble used for code version determination may be a shorter preamble than a square wave used for timing calibration, so such use of the preamble may have a smaller impact on users with faster devices. Accordingly, the slowest device supported may not affect the code processing time for all faster devices. It should also be noted that the preamble may serve both purposes in some cases (i.e., timing calibration and code version detection).

In some example embodiments, an adaptation that the adaptive signal detector 400 may be configured to implement may include the use of specific symbols to mark the start and end of a given loop or instance of the unique code. For example, a prolonged white or black screen could be used to separate instances of transmission of the unique code. In some cases, the symbol or character marking the end or beginning may have a predetermined length (e.g., 7 time units long). Thus, for example, for a 20 frames per second code sequence, the start/end signal may add about 350 ms to each code attempt. The start/end signal may also provide a common point from which synchronization may be accomplished (e.g., for iterative attempts as described below).

As noted above, edge detection can impact accuracy in code processing. For a typical code processing sequence, the system would repeatedly measure instantaneous light intensity and analyze a group of samples to determine whether the screen is white or black for each period of time. This generally works well under ideal conditions (e.g., when noise and lighting conditions do not change). However, ideal conditions are not always present. Accordingly, the processing circuitry 420 (e.g., with or via the context monitor 430) may be configured to not measure light intensity, but instead measure changes in light intensity. A significant change in intensity (i.e., greater than a fixed or dynamic threshold amount) over a short period of time would indicate a change between black/white (on/off, 1/0, +/−, etc.). Due to the rise and fall times of the signal, it may not by ideal to examine only the preceding sample when calculating the slope. By comparing one sample with another that is at least a full rise/fall time in the past, any ambiguity of the rise and fall time can be eliminated. Additionally, if the time difference is selected to synchronize with a typical AC signal, then noise at both a frequency of the signal and its harmonics may be eliminated.

A typical algorithm may be configured to detect a low or high signal by finding the midpoint between the highest and lowest samples in a given time period. This strategy may allow the algorithm to function when the lighting conditions change a little. However, if the lighting conditions change significantly in a short time period, this algorithm breaks down. To avoid such breakdown possibility, example embodiments of the processing circuitry 420 (e.g., via the context monitor 430) may be configured to instead measure the amplitude of the last X symbols and a threshold of Y percent of the measured value may be used to detect the next symbol. In other words, the processing circuitry 420 may be configured to perform a comparison of an average level of a given number of prior symbols to a threshold defined as a percentage of the average level in order to determine a given symbol level. The values of X and Y may be determined by designers and may allow the algorithm to adapt to changing environmental conditions while still filtering out noise. This processing paradigm may be referred to as automatic threshold detection.

In an example embodiment, the processing circuitry 420 may also be configured to employ flexible duration limits. In this regard, for example, with a code running at 20 frames per second, the expected duration for one code time unit (e.g., the duration of a dot and the space between dots/dashes in a character) is 50 ms. By employing flexible duration limits, the processing circuitry 420 may be configured to use a range of acceptable durations for detecting code symbols. Thus, for example, using the 50 ms nominal duration of each character described above, the time unit could be defined as a window of times having a duration between about 35 and 65 ms. This may ensure that stretching of signals due to host device 330 loading or other factors may not impact the ability of the processing circuitry 420 to effectively utilize the unique code in the optical signal 490 to unlock the device 300. In some embodiments, to support a binary protocol, it may not be desirable to look for a specific frame rate. Instead, a ratio between edge times may be determined. For example, ratios near 5:1:2:2 of four consecutive edges may indicate that a start sequence has been detected. Using ratios between edge times may allow for a greater range of variability among the capabilities of host devices.

In some examples, the processing circuitry 420 (e.g., via the host device evaluator 440) may also be configured to employ a strategy of combining iterative attempts for code processing. For example, if a start/end signal is used between subsequent unlock attempts (as described above), a clear demarcation may be provided between sequential instances of the unique code that are provided in the optical signal 490. The processing circuitry 420 may be configured to evaluate valid portions in multiple failed unlock attempts in order to combine the valid portions to define one complete valid code. In other words, two or more valid parts from multiple failed unlock attempts may be combined to define one single valid code by the processing circuitry 420.

As an example, if the unique code used for unlocking is "12345," which is repeatedly sent to the device 300 in poor lighting conditions, the processing circuitry 420 may decode "123xx" in a first sequence of code transmission, and may decode "xx345" in another sequence of code transmission. Rather than simply accept both attempts as failures, the processing circuitry 420 may be configured to, with the knowledge that the code has five characters and the sequences above were received, deduce that the valid code must be "12345." The start/end signal provides the processing circuitry 420 with the ability to determine which characters are in which positions to enable the deduction described above. However, the processing circuitry 420 may be further required in some cases to have at least one common character in the sequences that are combined. Thus, for example, "123xx" could not be combined with "xxx45," but "123xx" can be combined with "xx345" due to the existence of at least the common character 3 in the third position.

As an additional or alternative quality assurance measure, some example embodiments may employ a checksum and/or cyclic redundancy check to confirm data or even enable recovery of missing characters. For example, if the unique code is a five character unlock key, a sixth character may be added to contain the sum of the other characters (e.g., using base-36 math to account for both letters and numbers). As a simple example, if the code is "11111" then the checksum value of 5 would be the sixth character making the full code transmitted "111115." In such an example, receiving "111115" may confirm the accuracy of the code "11111." However, receiving "111 x15" may further enable the processing circuitry 420 to deduce that the missing character must be a "1" due to the checksum value of 5 and the other characters in the code sequence. Length checks may also be helpful in determining whether a signal was properly received with or without checksum and cyclic redundancy checks.

Figure 9:
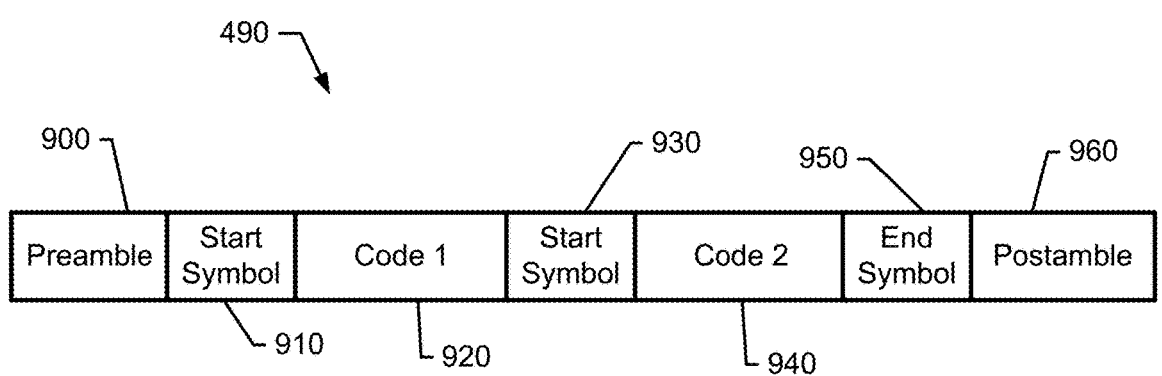
FIG. 9 is an example structure for an optical signal in accordance with an example embodiment.

FIG. 9 illustrates one example structure for the optical signal 490 in accordance with an example embodiment. In this regard, the optical signal 490 may include a preamble 900, which may be used to provide code version identification and/or timing calibration. A start symbol 910 may then be provided to indicate that an instance of the unique code will immediately follow. A first instance of the unique code 920 (i.e., the unlocking code) may then be provided. Start symbol 930 may either mark the end of the first instance of the unique code 920, or mark the beginning of a second instance of the unique code 940, or do both. Moreover, there could be separate start and end symbols, if desired. After the second instance of the unique code 940, an end symbol 950 may be provided. The end symbol 950 may then be followed with a postamble 960. As noted above, the optical signal 490 of FIG. 9 is merely one example, and other examples of the optical signal 490 could have more or fewer components than those shown in FIG. 9.

FIG. 10 illustrates a block diagram of a method of preventing unauthorized use of an aerosol generation device in accordance with an example embodiment. The method may include receiving a wireless signal (e.g., an optical signal or audible signal) including an unlock code for unlocking the aerosol provision device at operation 1000. The method may further include processing the wireless signal to determine host device characterization information or environmental context information at operation 1010. The method may also include tuning processing circuitry to process the unlock code based on the host device characterization information or environmental context information at operation 1020, and transitioning the aerosol provision device from a locked state to an unlocked state responsive to processing the unlock code at operation 1030. The method may include a number of modifications, augmentations, or optional additions, some of which are described herein. The modifications, augmentations or optional additions listed below may be added in any desirable combination. For example, tuning the processing circuitry may be performed in a number of ways, or include a number of different steps or operations. As an example, tuning the processing circuitry may include comparing a first light intensity during transmission of a preamble of the optical signal to a second light intensity during transmission of a postamble of the optical signal to determine a change in ambient lighting that occurs during transmission of the optical signal. Optionally or additionally, tuning the processing circuitry may include detecting changes in light intensity and determining edges in the optical signal based on the changes in intensity in light. Optionally or additionally, tuning the processing circuitry may include employing flexible duration limits defined for a window size for each symbol of the unlock code to extract the unlock code from the optical signal. Optionally or additionally, tuning the processing circuitry may include determining a code version for the unlock and processing the unlock code based on the determined code version. Optionally or additionally, tuning the processing circuitry may include performing timing calibration of the processing circuitry based on timing associated with a distinct waveform included in the optical signal. Optionally or additionally, tuning the processing circuitry may include configuring the processing circuitry to, in response to failure to decode all symbols of the unlock code, determine a missing symbol from the unlock code based on comparing symbols from multiple iterations of the unlock code based on the start symbol or the end symbol, or based on a checksum provided with the unlock code.

Some example embodiments may provide security against unauthorized use of an aerosol provision system. Accordingly, as can be appreciated from the examples above, an aerosol provision system may be provided. The aerosol provision system may include an aerosol provision device configured to interface with a consumable comprising aerosol generating material, an aerosol generator configured to generate an aerosol from the aerosol generating material, a lock assembly and an adaptive signal detector. The lock assembly may be configured to prevent operation of the aerosol generator for generating the aerosol in a locked state, and enable operation of the aerosol generator for generating the aerosol in an unlocked state. The lock assembly may also be configured to transition from the locked state to the unlocked state responsive to authentication of an unlock code received in a control signal from a host device in communication with an authentication agent via a network. The adaptive signal detector may be configured to process a control signal received wirelessly from the host device to extract the unlock code. The adaptive signal detector may also be configured to determine host device characterization information or environmental context information to facilitate extracting the unlock code from the control signal.

The aerosol provision system may include a number of modifications, augmentations, or optional additions, some of which are described herein. The modifications, augmentations or optional additions listed below may be added in any desirable combination. Within this context, the system as described above may be considered a first embodiment, and other embodiments may be defined by each respective combination of modifications, augmentations or optional additions. For example, a second embodiment may be defined in which the control signal is an optical signal. The adaptive signal detector may include an optical detector configured to receive the optical signal, and processing circuitry configured to process the optical signal to determine the host device characterization information or the environmental context information prior to extracting the unlock code. Alternatively or additionally, a third embodiment may be defined in which the adaptive signal detector includes a context monitor configured to determine the environmental context information. The context monitor may be configured to determine a change in ambient lighting that occurs during transmission of the optical signal. In an example embodiment, a fourth embodiment may be defined in which the context monitor may be configured to compare a first light intensity during transmission of a preamble of the optical signal to a second light intensity during transmission of a postamble of the optical signal to determine the change in ambient lighting. The fourth embodiment may be combined with any or all of embodiments one to three. In some examples, a fifth embodiment may be defined in which the context monitor may be further configured to detect edges in the optical signal based on detecting changes in intensity in light. The fifth embodiment may be combined with any or all of embodiments one to four. In an example embodiment, a sixth embodiment may be defined in which the context monitor may be further configured to detect edges in the optical signal based on automatic threshold detection comprising a comparison of an average level of a given number of prior symbols to a threshold defined as a percentage of the average level. The sixth embodiment may be combined with any or all of embodiments one to five. In some examples, a seventh embodiment may be defined in which the adaptive signal detector may include a host device evaluator configured to determine the host device characterization information. The host device characterization information may be determined from processing a preamble of the optical signal. The seventh embodiment may be combined with any or all of embodiments one to six. In an example embodiment, an eighth embodiment may be defined in which the host device characterization information includes information indicative of a code version for the unlock code that is being received from the host device based on information indicative of the code version in the preamble. The eighth embodiment may be combined with any or all of embodiments one to seven. In some examples, a ninth embodiment may be defined in which one or both of the preamble and a postamble of the optical signal may include a distinct waveform processed by the host device evaluator for timing calibration of the processing circuitry. The ninth embodiment may be combined with any or all of embodiments one to eight. In an example embodiment, a tenth embodiment may be defined in which the host device evaluator may be configured to detect one or both of a start symbol and an end symbol in the optical signal marking a beginning and end, respectively, of the unlock code. The tenth embodiment may be combined with any or all of embodiments one to nine. In some examples, an eleventh embodiment may be defined in which the processing circuitry may be configured to, in response to failure to decode all symbols of the unlock code, determine a missing symbol from the unlock code based on comparing symbols from multiple iterations of the unlock code based on the start symbol or the end symbol. The eleventh embodiment may be combined with any or all of embodiments one to ten. In some examples, a twelfth embodiment may be defined in which the processing circuitry may be configured to employ flexible duration limits defining a window size for each symbol of the unlock code. The twelfth embodiment may be combined with any or all of embodiments one to eleven. In some examples, a thirteenth embodiment may be defined in which the processing circuitry may be configured to, in response to failure to decode all symbols of the unlock code, determine a missing symbol from the unlock code based on a checksum provided with the unlock code. The thirteenth embodiment may be combined with any or all of embodiments one to twelve.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. An aerosol provision system comprising:
an aerosol provision device configured to interface with a consumable comprising aerosol generating material;
an aerosol generator configured to generate an aerosol from the aerosol generating material;
a lock assembly configured to prevent operation of the aerosol generator for generating the aerosol in a locked state, and enable operation of the aerosol generator for generating the aerosol in an unlocked state, the lock assembly being configured to transition from the locked state to the unlocked state responsive to authentication of an unlock code received in a control signal from a host device in communication with an authentication agent via a network; and
an adaptive signal detector comprising processing circuitry configured to process a control signal received wirelessly from the host device to extract the unlock code,
wherein the adaptive signal detector is configured to determine host device characterization information or environmental context information to facilitate extracting the unlock code from the control signal,
wherein the control signal is an optical signal,
wherein the adaptive signal detector comprises an optical detector configured to receive the optical signal, and processing circuitry configured to process the optical signal to determine the host device characterization information or the environmental context information prior to extracting the unlock code,
wherein the adaptive signal detector comprises a context monitor configured to determine the environmental context information,
wherein the context monitor is configured to determine a change in ambient lighting that occurs during transmission of the optical signal, and
wherein the context monitor is further configured to detect edges in the optical signal based on automatic threshold detection comprising a comparison of an average level of a given number of prior symbols to a threshold defined as a percentage of the average level.

2. An aerosol provision system comprising:
an aerosol provision device configured to interface with a consumable comprising aerosol generating material;
an aerosol generator configured to generate an aerosol from the aerosol generating material;
a lock assembly configured to prevent operation of the aerosol generator for generating the aerosol in a locked state, and enable operation of the aerosol generator for generating the aerosol in an unlocked state, the lock assembly being configured to transition from the locked state to the unlocked state responsive to authentication of an unlock code received in a control signal from a host device in communication with an authentication agent via a network; and
an adaptive signal detector comprising processing circuitry configured to process a control signal received wirelessly from the host device to extract the unlock code,
wherein the adaptive signal detector is configured to determine host device characterization information or environmental context information to facilitate extracting the unlock code from the control signal,
wherein the adaptive signal detector comprises a host device evaluator configured to determine the host device characterization information,
wherein the host device characterization information is determined from processing a preamble of the control signal, and
wherein the host device characterization information comprises information indicative of a code version for the unlock code that is being received from the host device based on information indicative of the code version in the preamble.

3. An aerosol provision system comprising:
an aerosol provision device configured to interface with a consumable comprising aerosol generating material;
an aerosol generator configured to generate an aerosol from the aerosol generating material;
a lock assembly configured to prevent operation of the aerosol generator for generating the aerosol in a locked state, and enable operation of the aerosol generator for generating the aerosol in an unlocked state, the lock assembly being configured to transition from the locked state to the unlocked state responsive to authentication of an unlock code received in a control signal from a host device in communication with an authentication agent via a network; and
an adaptive signal detector comprising processing circuitry configured to process a control signal received wirelessly from the host device to extract the unlock code,
wherein the adaptive signal detector is configured to determine host device characterization information or environmental context information to facilitate extracting the unlock code from the control signal,
wherein the adaptive signal detector comprises a host device evaluator configured to determine the host device characterization information,
wherein the host device characterization information is determined from processing a preamble of the control signal, and
wherein the host device evaluator is configured to detect one or both of a start symbol and an end symbol in the control signal marking a beginning and end, respectively, of the unlock code.

4. The system of claim 3, wherein the processing circuitry is configured to, in response to failure to decode all symbols of the unlock code, determine a missing symbol from the unlock code based on comparing symbols from multiple iterations of the unlock code based on the start symbol or the end symbol.

5. An aerosol provision system comprising:
   an aerosol provision device configured to interface with a consumable comprising aerosol generating material;
   an aerosol generator configured to generate an aerosol from the aerosol generating material;
   a lock assembly configured to prevent operation of the aerosol generator for generating the aerosol in a locked state, and enable operation of the aerosol generator for generating the aerosol in an unlocked state, the lock assembly being configured to transition from the locked state to the unlocked state responsive to authentication of an unlock code received in a control signal from a host device in communication with an authentication agent via a network; and
   an adaptive signal detector comprising processing circuitry configured to process a control signal received wirelessly from the host device to extract the unlock code,
   wherein the adaptive signal detector is configured to determine host device characterization information or environmental context information to facilitate extracting the unlock code from the control signal, and
   wherein the processing circuitry is configured to employ flexible duration limits defining a window size for each symbol of the unlock code.

6. An aerosol provision system comprising:
   an aerosol provision device configured to interface with a consumable comprising aerosol generating material;
   an aerosol generator configured to generate an aerosol from the aerosol generating material;
   a lock assembly configured to prevent operation of the aerosol generator for generating the aerosol in a locked state, and enable operation of the aerosol generator for generating the aerosol in an unlocked state, the lock assembly being configured to transition from the locked state to the unlocked state responsive to authentication of an unlock code received in a control signal from a host device in communication with an authentication agent via a network; and
   an adaptive signal detector comprising processing circuitry configured to process a control signal received wirelessly from the host device to extract the unlock code,
   wherein the adaptive signal detector is configured to determine host device characterization information or environmental context information to facilitate extracting the unlock code from the control signal, and
   wherein the processing circuitry is configured to, in response to failure to decode all symbols of the unlock code, determine a missing symbol from the unlock code based on a checksum provided with the unlock code.

* * * * *